(12) United States Patent
Chen et al.

(10) Patent No.: US 12,107,340 B2
(45) Date of Patent: Oct. 1, 2024

(54) WIRELESS COMMUNICATION DEVICE

(71) Applicant: AGC Inc., Tokyo (JP)

(72) Inventors: Qiang Chen, Sendai (JP); Hiroyasu Sato, Sendai (JP); Osamu Kagaya, Tokyo (JP); Toshiki Sayama, Tokyo (JP)

(73) Assignee: AGC Inc., Tokyo (JP)

( * ) Notice: Subject to any disclaimer, the term of this patent is extended or adjusted under 35 U.S.C. 154(b) by 473 days.

(21) Appl. No.: 17/399,532

(22) Filed: Aug. 11, 2021

(65) Prior Publication Data

US 2021/0376462 A1 Dec. 2, 2021

Related U.S. Application Data

(63) Continuation of application No. PCT/JP2020/010637, filed on Mar. 11, 2020.

(30) Foreign Application Priority Data

Mar. 15, 2019 (JP) .................................. 2019-048419

(51) Int. Cl.
| | | |
|---|---|---|
| *H01Q 3/00* | (2006.01) | |
| *H01Q 3/24* | (2006.01) | |
| *H01Q 1/12* | (2006.01) | |
| *H01Q 3/22* | (2006.01) | |
| *H01Q 3/26* | (2006.01) | |

(52) U.S. Cl.
CPC ................. *H01Q 3/24* (2013.01); *H01Q 3/00* (2013.01); *H01Q 1/1271* (2013.01); *H01Q 3/22* (2013.01); *H01Q 3/26* (2013.01)

(58) Field of Classification Search
CPC .. H01Q 3/24; H01Q 3/22; H01Q 3/26; H01Q 3/00; H01Q 1/1271
USPC ................................................... 342/373, 368
See application file for complete search history.

(56) References Cited

U.S. PATENT DOCUMENTS

| 10,903,568 | B2 * | 1/2021 | Bulja | H01Q 1/1271 |
| 11,271,303 | B2 * | 3/2022 | Yao | H01Q 5/25 |
| 11,346,779 | B2 * | 5/2022 | Wang | B32B 17/10055 |

(Continued)

FOREIGN PATENT DOCUMENTS

| CN | 106876982 A | | 6/2017 | | |
| CN | 115708394 A | * | 2/2023 | ........... | H01L 31/105 |

(Continued)

OTHER PUBLICATIONS

International Search Report issued Jun. 23, 2020 in PCT/JP2020/010637, filed on Mar. 11, 2020, 2 pages.

(Continued)

*Primary Examiner* — Chuong P Nguyen
(74) *Attorney, Agent, or Firm* — Oblon, McClelland, Maier & Neustadt, L.L.P.

(57) ABSTRACT

A wireless communication device includes a base material; a directivity control array and a wiring disposed on the base material, the directivity control array having a plurality of unit elements disposed in a certain two-dimensional pattern, and the wiring connected to a DC power supply to apply a DC voltage to desired unit elements; the wireless communication device further comprising a controller to control the DC voltage to be applied to the desired unit elements.

20 Claims, 27 Drawing Sheets

(56) References Cited

U.S. PATENT DOCUMENTS

| | | | |
|---|---|---|---|
| 11,777,224 B2* | 10/2023 | Achour | H01Q 15/0026 |
| | | | 343/909 |
| 2016/0013531 A1 | 1/2016 | Casse et al. | |
| 2019/0067826 A1* | 2/2019 | Achour | H01Q 21/065 |
| 2020/0158634 A1* | 5/2020 | Wang | H01Q 3/38 |
| 2020/0161759 A1* | 5/2020 | Bulja | H01Q 9/045 |

FOREIGN PATENT DOCUMENTS

| | | |
|---|---|---|
| DE | 10 2011 050 469 A1 | 11/2012 |
| JP | 2008-219125 A | 9/2008 |
| JP | 2012-49931 A | 3/2012 |
| JP | 2013-48344 A | 3/2013 |
| JP | 2016-21741 A | 2/2016 |

OTHER PUBLICATIONS

Yang et al., "A 1-Bit 10X10 Reconfigurable Reflectarray Antenna: Design, Optimization, and Experiment", IEEE Transactions on Antennas and Propagation. vol. 64, No. 6, Jun. 2016, 10 pages.

Aleksi Tamminen et al., "Reflectarray for 120-GHz beam steering application: design, simulations, and measurements". Proc of SPIE, vol. 8362, pp. 836205-1-836205-11.

Choe, H. et al., "High-directivity on-glass window antenna using a see-through reflector," IET Microwaves, Antennas & Propagation, vol. 8, 2014, pp. 1294-1298.

* cited by examiner

| Instruction ID | Voltage application pattern |
|---|---|
| 0001 | Pattern A |
| 0002 | Pattern B |
| ⋮ | ⋮ |

Fig. 18E

| | 1 | 2 | 3 | 4 | 5 | 6 | 7 | 8 |
|---|---|---|---|---|---|---|---|---|
| 1 | OFF | OFF | ON | ON | OFF | OFF | ON | ON |
| 2 | OFF | OFF | ON | ON | OFF | OFF | ON | ON |
| 3 | OFF | OFF | ON | ON | OFF | OFF | ON | ON |
| 4 | OFF | OFF | ON | ON | OFF | OFF | ON | ON |
| 5 | OFF | OFF | ON | ON | OFF | OFF | ON | ON |
| 6 | OFF | OFF | ON | ON | OFF | OFF | ON | ON |
| 7 | OFF | OFF | ON | ON | OFF | OFF | ON | ON |

Fig. 19E

| | 1 | 2 | 3 | 4 | 5 | 6 | 7 | 8 |
|---|---|---|---|---|---|---|---|---|
| 1 | OFF | OFF | OFF | OFF | OFF | ON | ON | ON |
| 2 | OFF | OFF | OFF | OFF | OFF | ON | ON | ON |
| 3 | OFF | OFF | OFF | OFF | OFF | ON | ON | ON |
| 4 | OFF | OFF | OFF | OFF | OFF | ON | ON | ON |
| 5 | OFF | OFF | OFF | OFF | OFF | ON | ON | ON |
| 6 | OFF | OFF | OFF | OFF | OFF | ON | ON | ON |
| 7 | OFF | OFF | OFF | OFF | OFF | ON | ON | ON |
| 8 | | | | | | | | ON |

Fig. 20E

|   | 1 | 2 | 3 | 4 | 5 | 6 | 7 | 8 |
|---|---|---|---|---|---|---|---|---|
| 1 | ON | OFF | OFF | OFF | ON | ON | OFF | ON |
| 2 | ON | OFF | OFF | OFF | ON | ON | OFF | ON |
| 3 | ON | OFF | OFF | OFF | ON | ON | OFF | ON |
| 4 | ON | OFF | OFF | OFF | ON | ON | OFF | ON |
| 5 | ON | OFF | OFF | OFF | OFF | OFF | OFF | ON |
| 6 | OFF | ON | ON | ON | OFF | OFF | ON | OFF |
| 7 | OFF | ON | ON | ON | OFF | OFF | ON | OFF |
| 8 | ON | OFF | OFF | OFF | ON | ON | OFF | ON |

WIRELESS COMMUNICATION DEVICE

This application is a continuation of PCT Application No. PCT/JP2020/010637, filed on Mar. 11, 2020, which is based upon and claims the benefit of priority from Japanese Patent Application No. 2019-048419 filed on Mar. 15, 2019. The contents of those applications are incorporated herein by reference in their entireties.

TECHNICAL FIELD

The disclosure relates to a wireless communication device.

BACKGROUND ART

Technologies relating to directivity control arrays, such as reflect arrays, are known. It is also known that when the property of a meta-material is utilized in the fabrication of such directivity control arrays, an incident radio wave can be reflected or passed through in a mode to provide the radio wave with a desired directivity. (For example, see Patent Documents 1 and 2.)

PRIOR ART DOCUMENTS

Patent Documents

Patent Document 1: JP-A-2012-049931
Patent Document 2: JP-A-2013-48344

DISCLOSURE OF INVENTION

Technical Problem

It is, however, difficult for the above-mentioned technologies to be utilized to dispose a directivity control array without significantly reducing the transmittance of visible light passing through a transparent object, such as glass.

From this point of view, it is an object of the present invention, as one aspect of the invention, to dispose a directivity control array without significantly reducing the transmittance of visible light passing through a transparent object, such as glass.

Solution to Problem

According to the one aspect of the invention, there is provided a wireless communication device, which includes a base material; a directivity control array and a wiring disposed on the base material, the directivity control array having a plurality of unit elements disposed in a certain two-dimensional pattern, the wiring being connected to a DC power supply to apply a DC voltage to desired unit elements, and which further includes a controller to control the DC voltage to be applied to the desired unit elements.

Advantageous Effects of Invention

According to one aspect, the present invention can dispose a directivity control array without significantly reducing the transmittance of visible light passing through a transparent object.

BRIEF DESCRIPTION OF DRAWINGS

FIG. 100 is a view illustrating a voltage application pattern.

FIG. 18E is a view illustrating the specific voltage application pattern.

FIG. 19E is a view illustrating the specific voltage application pattern.

FIG. 20E is a view illustrating the specific voltage application pattern.

FIG. 21 is a view illustrating one example which still another specific voltage application pattern is appropriately applied to.

DESCRIPTION OF EMBODIMENTS

Figure 1:
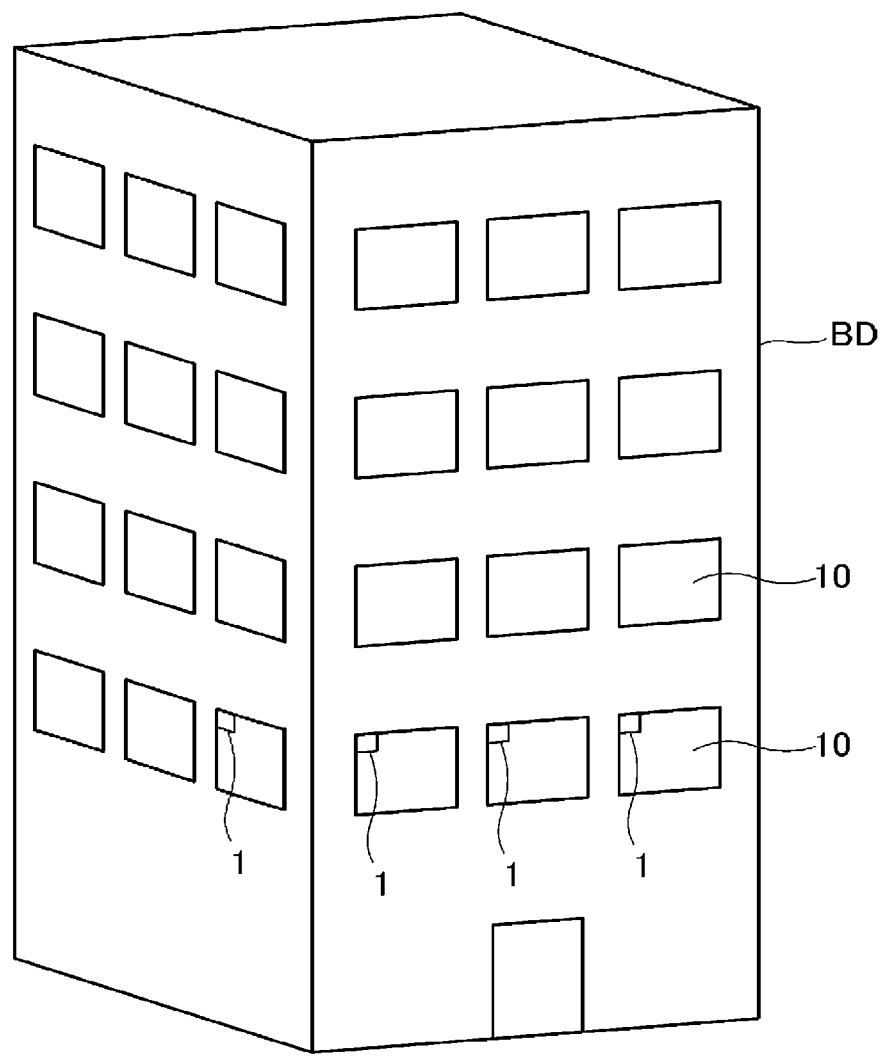
FIG. 1 is a schematic view schematically illustrating one example of a building BD, where the communication device according to Embodiment 1 of the present invention is present.

Now, respective embodiments of the present invention will be described in detail in reference to the accompanying drawings. It should be noted that when there are common members or parts having the same attribute, only some of the common members or parts will be denoted with reference numerals in the drawings on some occasions for easy visibility.

Embodiment 1

FIG. 1 is a schematic view schematically illustrating one example of a building BD, where the communication device 1 according to Embodiment 1 of the present invention (as an example of the wireless communication device) is present.

The communication device 1 according to this embodiment may be present, for example, at the building BD as shown in FIG. 1. The building BD may be of any type of building and be a building in an area, for example, where skyscrapers are located in close proximity. In areas where skyscrapers are located in close proximity, an insensitive zone is likely to be created where a radio wave fails to reach in a normal way (spaces where a communication environment is not good, also called "dead zone"). The communication device 1 serves to reduce the problem of the formation of an insensitive area as described later. In Description, the term "insensitive area" means an insensitive area in a case where the communication device 1 according to this embodiment is not present.

The communication device 1 may be utilized in any optional communication system, such as LTE (Long Term Evolution), LTE-A (LTE-Advanced), the 5th Generation Mobile Communication System, UMB (Ultra Mobile Broadband), IEEE802.11 (Wi-Fi (trademark)), IEEE802.16 (WiMAX (trademark)), IEEE802.20, UWB (Ultra-Wideband), Bluetooth (trademark), LPWA (Low Power Wide Area), or another extended communication system.

The usefulness of the communication system 1 increases in such areas or zones because the communication system 1 functions as a base station system as described later. It should be noted that higher frequencies are likely to form such insensitive areas because of leading to an increase in propagation loss due to reflection or diffraction. From this point of view, the communication system 1 is appropriate to communication using a comparative high frequency.

In this embodiment, the communication system 1 is disposed at window glasses 10 of the building BD as one example, as shown in FIG. 1. In this case, the communication system 1 may be disposed at every window glass of the building BD or be disposed at one or some of window glasses of the building BD as shown in FIG. 1. For example, the window glass where the communication device 1 is disposed may be a window glass 10 in an insensitive area or a window glass 10 at a peripheral position of an insensitive area. The height of the window glass or window glasses 10 from the ground is preferably 1 to 14 m, particularly preferably 2 to 10 m in terms of the effectiveness of radio waves.

Figure 2:
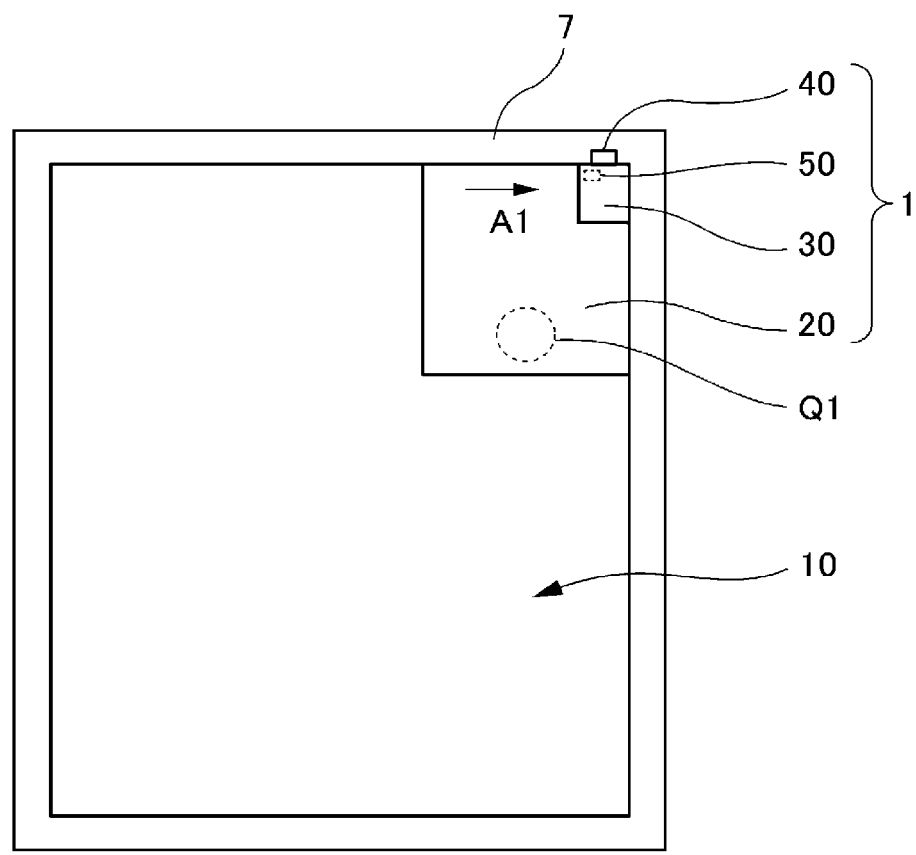
FIG. 2 is a view schematically illustrating the communication device disposed on a window glass.
Figure 3:
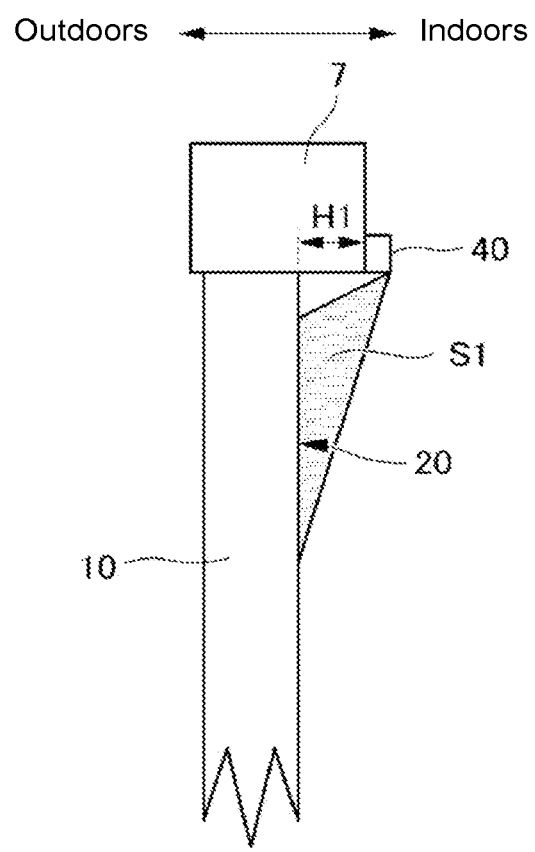
FIG. 3 is a schematic view as viewed in the direction of an arrow A1 in FIG. 2.

FIG. 2 is a plan view schematically illustrating the communication device 1 disposed at a window glass 10, which is viewed perpendicular to a surface of the window glass 10. FIG. 3 is a schematic view as viewed in the direction of the arrow A1 in FIG. 2.

In FIG. 2, not only the window glass 10 but also its sash (frame) 7 is shown. The window glass is transparent. In Description, the term "transparent" means a state where the transmittance of visible light is at least 50%, preferably at least 60%, more preferably at least 70%. The window glass 10 may be a double grazing unit, where the number of the layers is arbitrary. In a modification, a transparent plate, which is made of a material, for example, a resin (such as polyethylene terephthalate (PET) or polyethylene), a composite of glass and a resin (such as fiber-reinforced plastics) or a ceramic material, may be utilized, instead of the window glass 10.

The window glass 10 has a desired thickness. The glass plate forming the window glass 10 may be made of transparent inorganic glass, for example. Examples of the inorganic glass include normal soda-lime glass, borosilicate glass, alkali-free glass, and quartz glass. Although there is no particular limitation to the production process, float glass produced by the float process is exemplified. A colorless and transparent material with no coloring component added thereto, or a colored transparent material may be utilized.

In this embodiment, the communication device 1 includes a directivity control array 20, a printed board 30, an antenna unit 40, and a processor 50 as shown in one example in FIG. 2.

The directivity control array 20 is a reflect array. The directivity control array 20 is disposed, using the window glass 10 as a dielectric base material (one example of a base material having a transmittance of at least 50% for visible light). The directivity control array 20 may be disposed on the entire surface of the window glass 10, or be disposed on a part of the window glass 10 as shown in FIG. 2. It should be noted that the directivity control array 20 is preferably disposed in a mode to be adjacent to the sash 7 as shown in FIG. 2. In this case, the sash 7 can be utilized to readily realize a wiring structure having a good appearance. The structure of the directivity control array 20 will be described later. It should be noted that the base material has a transmittance of preferably at least 60%, particularly preferably at least 70% for visible light, in terms of transparency.

On the printed board 30, various electronic components (including the processor 50) related to the directivity control array 20 are mounted. The printed board 30 is disposed on the window glass 10 as in the directivity control array 20. It should be noted that the printed board 30 may be disposed in the sash 7 or at another place in a modification.

The antenna unit 40 radiates a radio wave toward the directivity control array 20 as shown in FIG. 3. Although the antenna unit 40 may be disposed on the window glass 10, the antenna unit 40 is preferably disposed on the sash 7 as shown in FIG. 3. When the antenna unit 40 is disposed on the sash 7, the antenna unit can readily radiate a radio wave over a comparative wide range (range where the directivity control array is disposed) on the window glass 10, making use of the height H1 of the sash 7 to the window glass 10. It should be noted that how a radio wave is radiated from the antenna unit 40 is schematically illustrated as a hatched area S1 in FIG. 3.

The processor 50 is mounted on the printed board 30. The processor 50 may have some components mounted on a different member from the printed board 30. The processor 50 controls the directivity of a radio wave reflected by the directivity control array 20, which will be described later.

Although the printed board 30 (consequently, along with the processor 50) is shown to be disposed on the window glass 10 in FIG. 2, the position of the printed board is not limited to this shown mode. At least one component (such as, a DC power supply generator 53) on the printed board 30 (consequently, along with the processor 50) may be disposed at another place, such as a wall, a ceiling or a floor adjacent to the window glass 10. In this regard, at least one component (such as, a DC power supply generator 53) on the printed board 30 (consequently, along with the processor 50) is preferably disposed at an invisible place, such as inside of a wall, inside a ceiling, or under a floor, which can provide the communication device with a better appearance. From a similar point of view, the antenna unit 40 may be disposed at another place, such as a wall, a ceiling or a floor adjacent to the window glass 10, or a wall, a ceiling or a floor not adjacent to the window glass 10.

Figure 4:
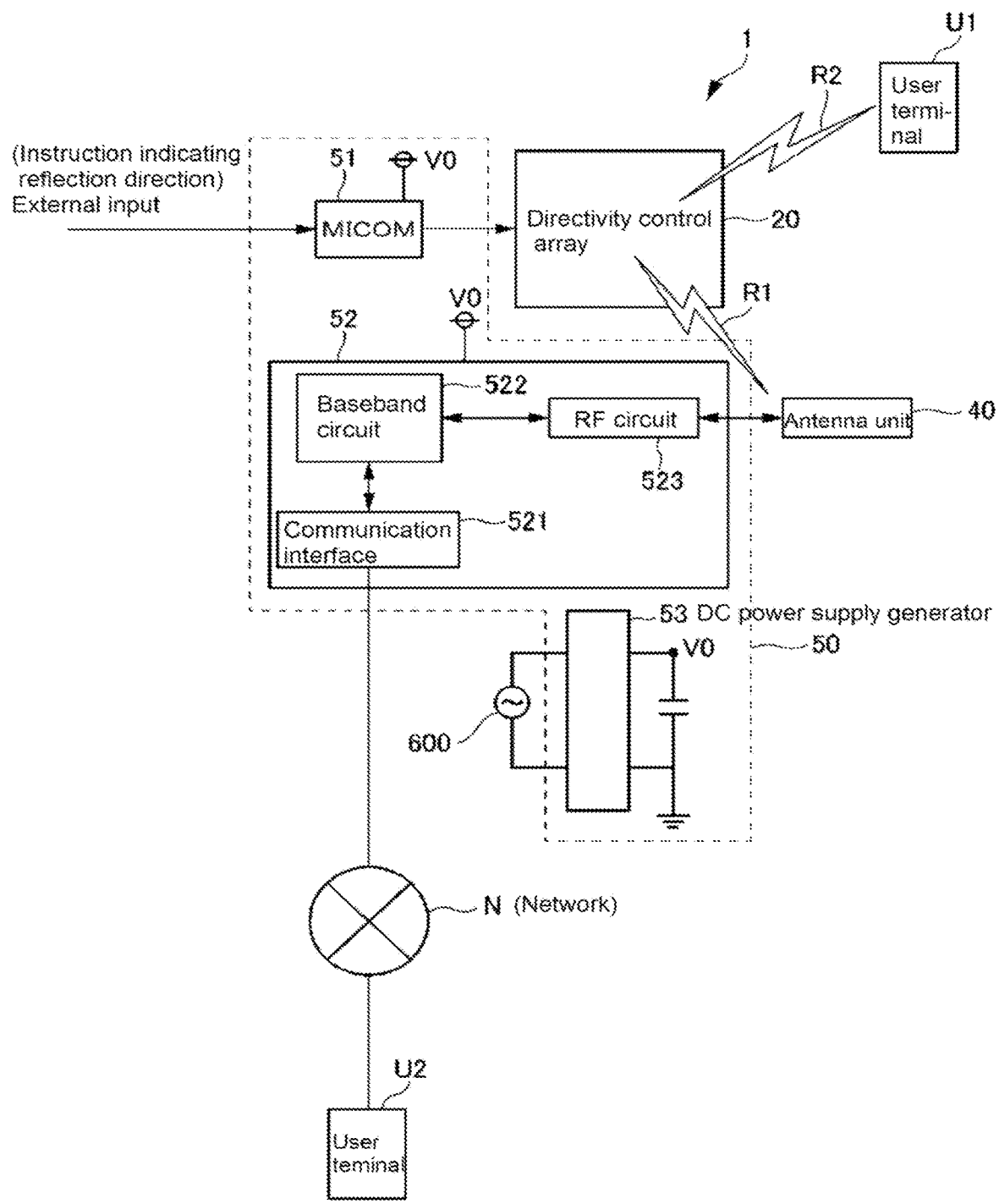
FIG. 4 is a view schematically illustrating a control system related to the communication device according to Embodiment 1, and how communication is made using the communication device.

FIG. 4 is a view schematically illustrating a control system related to the communication device 1 according to this embodiment, and how communication is made using the communication device 1. In FIG. 4, two user terminals U1 and U2 are shown. In the following explanation, the user terminal U2 will be also called "external user terminal U2" for distinction. FIG. 4 illustrates how the external user terminal U2 and the user terminal U1 communicate each other. It is assumed that the user terminal U1 is present in a room of the building BD, for example (see FIG. 5). In the explanation related to FIG. 4, the terms "reception" and "transmission" are used with respect to the user terminal U1 unless specifically mentioned. For example, the term "reception" means the "reception" where the user terminal U1 receives e.g., data from the external user terminal U2.

As shown in FIG. 4, the processor 50 includes a microcomputer 51 (hereinbelow, referred to as "MICOM 51") as one example of the controller, a communication circuit 52, and the DC power supply generator 53 as one example of a power supply generator.

The MICOM 51 controls the directivity control array 20. The MICOM 51 receives an instruction indicating a directivity (instruction indicating a reflection direction) as an external input. The external input may be input from, e.g., a control computer (not shown) for controlling the building BD, the user terminal U1 or the like. The MICOM 51 controls the directivity control array 20 based on the instruction indicating a directivity. This control will be described later in reference to FIG. 11 and so on. The MICOM 51 may control the communication circuit 52 and another device. The MICOM 51 operates based on a power supply voltage V0 generated by the DC power supply generator 53.

The communication circuit 52 includes a communication interface 521, a baseband circuit 522, and an RF circuit 523. The communication circuit 52 operates based on the power supply voltage V0 generated by the DC power supply generator 53.

The communication circuit 52 is connected to an external network N through the communication interface 521 to communicate with the external user terminal U2 through the network N. It should be noted that the communication dealt with by the communication circuit 52 includes any arbitrary communication, such as voice communication and data communication.

The network N may include a wireless communication network, the internet, a VPN (Virtual Private Network), a WAN (Wide Area Network), a wired network, and an arbitrary combination thereof.

The external user terminal U2 is a different terminal from the user terminal U1 described later, and is present at, e.g., a remote position with respect to the user terminal U1. In summary, e.g., in a situation where the external user terminal U2 and the user terminal U1 communicate each other (situation shown in FIG. 4), the respective users of the external user terminal U2 and the user terminal U1 are supposed to be different users.

The communication interface 521 is an interface for communication with the network N.

The baseband circuit 522 deals with mutual conversion between an IP packet and a baseband signal.

The RF circuit 523 performs D/A (Digital-to-Analog) conversion, modulation, frequency modulation, power amplification, or other processing of a baseband signal received from the baseband circuit 522 in order to generate a wireless signal (RF signal) to be transmitted from the antenna unit 40. The RF circuit 523 performs frequency modulation, A/D (Analog to Digital) conversion, demodulation, or other processing of a wireless signal received from the antenna unit 40 in order to generate a baseband signal, following by forwarding the baseband signal to the baseband circuit 522.

When data or another signal is received from the external user terminal U2, the baseband circuit 522 receives reception data through the communication interface 521, generates a baseband signal based on the reception data so as to match the received data, and forwards the baseband signal to the RF circuit 523. In this case, the RF circuit 523 generates a wireless signal based on the baseband signal from the baseband circuit 522 so as to match the baseband signal, and radiates, through the antenna unit 40, a transmission radio wave matched to the generated wireless signal (see R1 in FIG. 4).

When data or another signal is transmitted to the external user terminal U2, the RF circuit 523 generates a baseband signal so as to match the received radio wave (radio wave from the user terminal U1) through the antenna unit 40, and forwards the baseband signal to the baseband circuit 522. The baseband circuit 522 generates transmission data based on the baseband signal received through the RF circuit 523, and transmits the generated transmission data to the external user terminal U2 through the communication interface 521.

The DC power supply generator 53 is electrically connected to an external power source, such as an AC power supply 600 (AC power supply supplied to the building BD), and generates the power supply voltage V0 as DC supply based on the AC power supply 600 as shown in FIG. 4. The power supply voltage V0 generated by the DC power supply generator 53 is utilized not only to operate the MICOM 51 and the communication circuit 52 but also to operate the directivity control array 20. The operation of the directivity control array 20 will be described in detail later.

Figure 5:
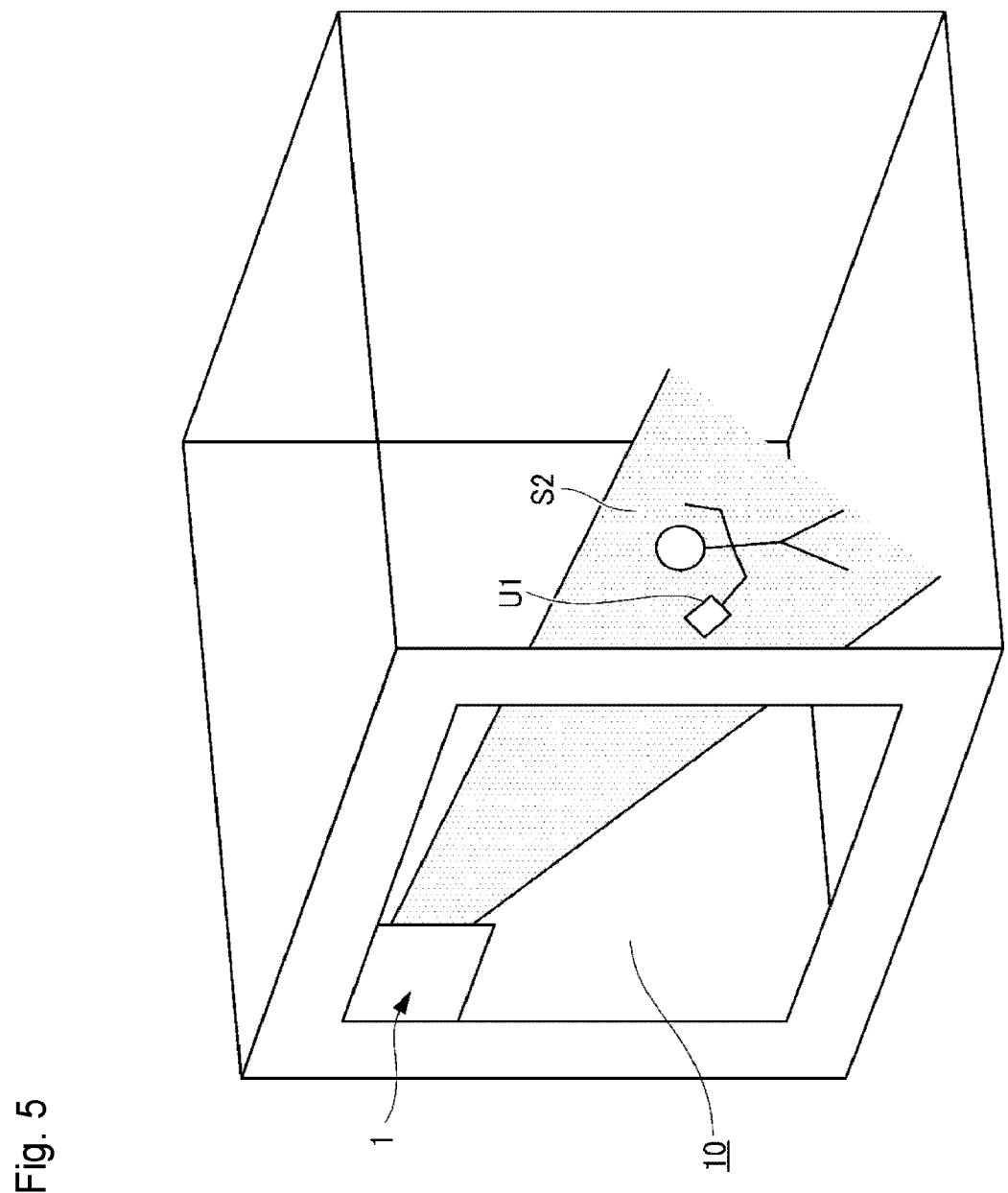
FIG. 5 is an illustrative view of an operation of the communication device.

FIG. 5 is an illustrative view of the operation of the communication device 1, and a schematic view illustrating the situation of a room where the communication device 1 is disposed at the window glass 10. In FIG. 5, how the radio wave (see the arrow R2 in FIG. 4) transmitted to the user terminal U1 from the directivity control array 20 of the communication device 1 radiates is schematically shown by a hatched area S2.

In a reception operation, when a radio wave is incident though the antenna unit 40 (see FIG. 3), the directivity control antenna 20 outputs a reflection wave toward indoors based on the incident radio wave (see the arrow R2 in FIGS. 4 and S2 in FIG. 5). For example, a radio wave related to reception data from the external user terminal U2 is radiated toward the directivity control array 20 from the antenna unit 40 as described above. Thus, the indoor user terminal U1 can receive the reflection wave from the directivity control array 20 to receive the reception data from the external user terminal U2 in this case.

In a transmission operation, when a radio wave is incident from the user terminal U1 (see the arrow R2 in FIG. 4), the directivity control antenna 20 outputs a reflection wave toward the antenna unit 40 based on the incident radio wave (see the arrow R1 in FIG. 4). For example, a radio wave related to transmission data to the user terminal U2 is radiated from the user terminal U1 as described above, and is incident on the directivity control array 20. Thus, the antenna unit 40 receives the reflection wave from the directivity control array 20 such that the communication device 1 can transmit the transmission data to the external user terminal U2 (through the communication circuit 52 and the network N) in this case.

In accordance with the communication form shown in FIG. 4, the user terminal U1 and the external user terminal U2 can communicate each other through the communication device 1. Specifically, communication can be established between the indoor user terminal U1 and the external user terminal U2 by utilizing the directivity control array 20 disposed by making use of the window glass 10. Thus, the communication device 1 functions as a base station device such that the user terminal U1 can communicate with the external terminal U2 even when the user terminal U1 is present in an insensitive area as described above.

Figure 6:
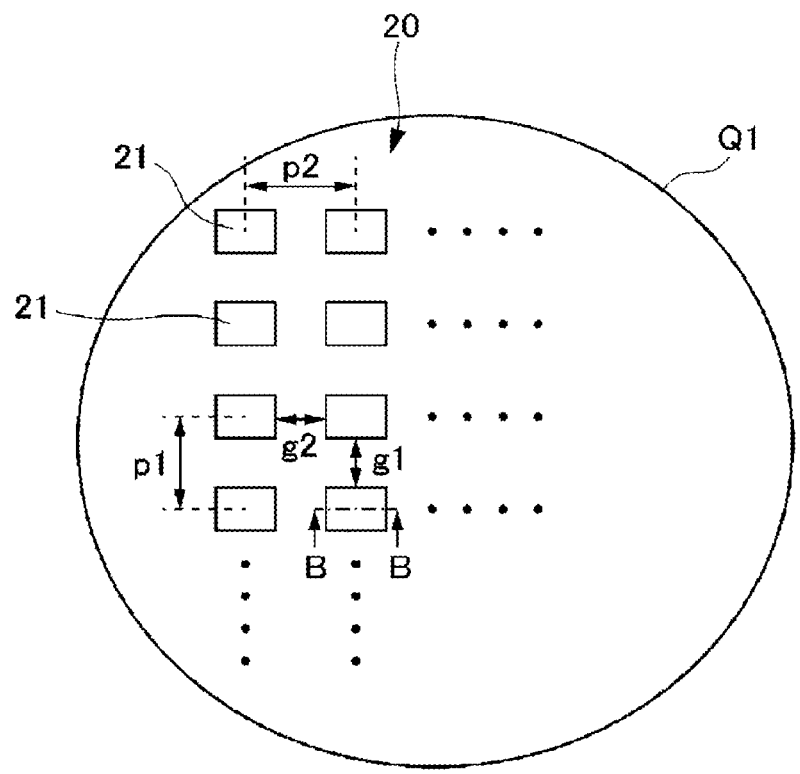
FIG. 6 is an enlarged view of a portion Q1 shown in FIG. 2.

Now, the directivity control array 20 will be further described in reference to FIG. 6 and its subsequent figures.

Figure 7:
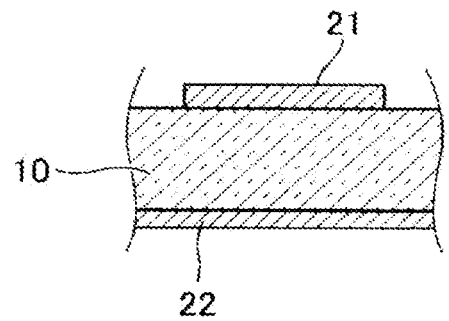
FIG. 7 is a cross-sectional view taken along line B-B of FIG. 6.

FIG. 6 is an enlarged view of a portion Q1 shown in FIG. 2 and an illustrative view of the directivity control array 20. FIG. 7 is a cross-sectional view taken along line B-B of FIG. 6. It should be noted that FIG. 6 is supposed to be a plan view as viewed from an inner side of the window glass 10. It should be noted that FIG. 6 does not illustrate a wiring 90 and a switching circuit 94, which will be described later in reference to FIG. 8A.

As shown in FIG. 6, the directivity control array 20 includes a plurality of conductors 21 disposed on the window glass 21. The respective conductors 21 form single unit elements 70 described later and are disposed in a certain two-dimensional pattern. The certain two-dimensional pattern may be determined by various kinds of parameters p1, p2, g1, g2 and another parameter, which are shown in FIG. 6 for example. The previously described FIG. 3 does not illustrate thin conductors 21 and other elements, which form the directivity control array 20 (This is also applicable to FIG. 10A and its subsequent figures described later).

A parameter p1 is the pitch between adjacent conductors in a vertical direction in this figure, a parameter p2 is the pitch between adjacent conductors in a lateral direction in this figure, a parameter g1 is the separation distance between adjacent conductors in a vertical direction in this figure, and a parameter g2 is the separation distance between adjacent conductors in the lateral direction in this figure. It should be noted that the parameter p1 and the parameter g1 are affected by the vertical size of each of the conductors 21, and the vertical size of each of the conductors 21 may be utilized as a new parameter. This is also applicable to the lateral size of each of the conductors 21.

It is not essential that each of the parameters p1, p2, g1, and g2 is constant. The parameters may be adapted so as to realize a desired directivity for every voltage application pattern to the unit elements 70 described later. Although it is shown in FIG. 6 that the conductors 21 are formed in a rectangular shape in planar view, it is not essential that the conductors are formed in a rectangular shape, and that the conductors are formed in a constant shape. Some or all of the conductors 21 may have a three-dimensional structure (in other words, a characteristic shape in the vertical direction with respect to the surface of the window glass 10).

The directivity control array 20 may have a grounding conductor 22 disposed so as to be opposed to the conductors 21 across the window glass 10 as shown in FIG. 7. In other words, the conductor 22 may be disposed, on an outer side of the window glass 10, in an area opposing the conductors 21 (i.e., area where the directivity control array 20 is disposed). It should be noted that the conductor 22 may be omitted in a modification. Although the conductor 22 is disposed, not being divided into plural members in this embodiment, the conductor 22 may be divided into plural members.

In this embodiment, the conductors 21 and the conductor 22 are preferably transparent. By this arrangement, the area of the window glass 10 where the conductors 21 and the conductor 22 are disposed (i.e., the area of the window glass 10 where the directivity control array 20 is disposed) can be made transparent. In other words, the conductors 21 and the conductor 22 can be disposed on the window glass 10 without significantly reducing the transmittance of the window glass 10 for visible light. Thus, the directivity control array 20 can be disposed, utilizing the window glass 10, without significantly reducing the transmittance of the window glass 10 for visible light.

Each of the conductors 21 and the conductor 22 may be a conductor made of an oxide, such as a tin oxide-doped indium oxide (ITO) or a tin dioxide, or a multiple layered conductor, such as Low-E. Low-E is an abbreviation of Low emissivity. There is known a film wherein a transparent conductive oxide film or a silver film having a film thickness of about 10 nm is sandwiched by dielectric layers and coated by a multilayer silver film having a low reflectance in a visible region and a high reflectance in an infrared region. There is no particular limitation to the thickness of each of the conductors 21 and the conductor 22. In one example, each of the conductors 21 and the conductor 22 may have a thickness of 0.002 mm to 0.020 mm. When each of the conductors 21 and the conductor 22 has a thickness of at most 0.020 mm, patterning by etching is made easy. With respect to the conductivity of each of the conductors 21, each of the conductors 21 has a sheet resistance of preferably at most 10 Ω/sq, more preferably at most 1 Ω/sq, most preferably at most 0.1 in terms of performance as the array. With respect to the conductivity of the conductor 22, the conductor 22 has a sheet resistance of preferably at most 10 Ω/sq, more preferably at most 1 Ω/sq, most preferably at most 0.1Ω in terms of performance.

Each of the conductors 21 may be disposed in a mesh shape. Each of the conductors 21 can be disposed in a mesh shape to increase the see-through performance and the translucency of the conductors 21 (and, consequently, the see-through performance and the translucency of the area of the window glass 10 where the directivity control array 20 is disposed).

When each of the conductors 21 may be disposed in a mesh shape, the mesh holes may be rectangular or rhomboidal. When the mesh holes are formed in a rectangular shape, the mesh holes are preferably formed in a square shape. When the mesh holes are formed in a square shape, it is possible to have a better appearance. The mesh holes may be formed in random shapes by using a self-organization process. When the mesh holes are formed in random shapes, it is possible to reduce the occurrence of moire. The mesh has a line width of preferably 5 to 30 µm, more preferably 6 to 15 µm. The mesh has a line interval of preferably 50 to 500 µm, more preferably 100 to 300 µm.

The conductor 22 may be also formed in a mesh shape as in each of the conductors 21.

Figure 8A:
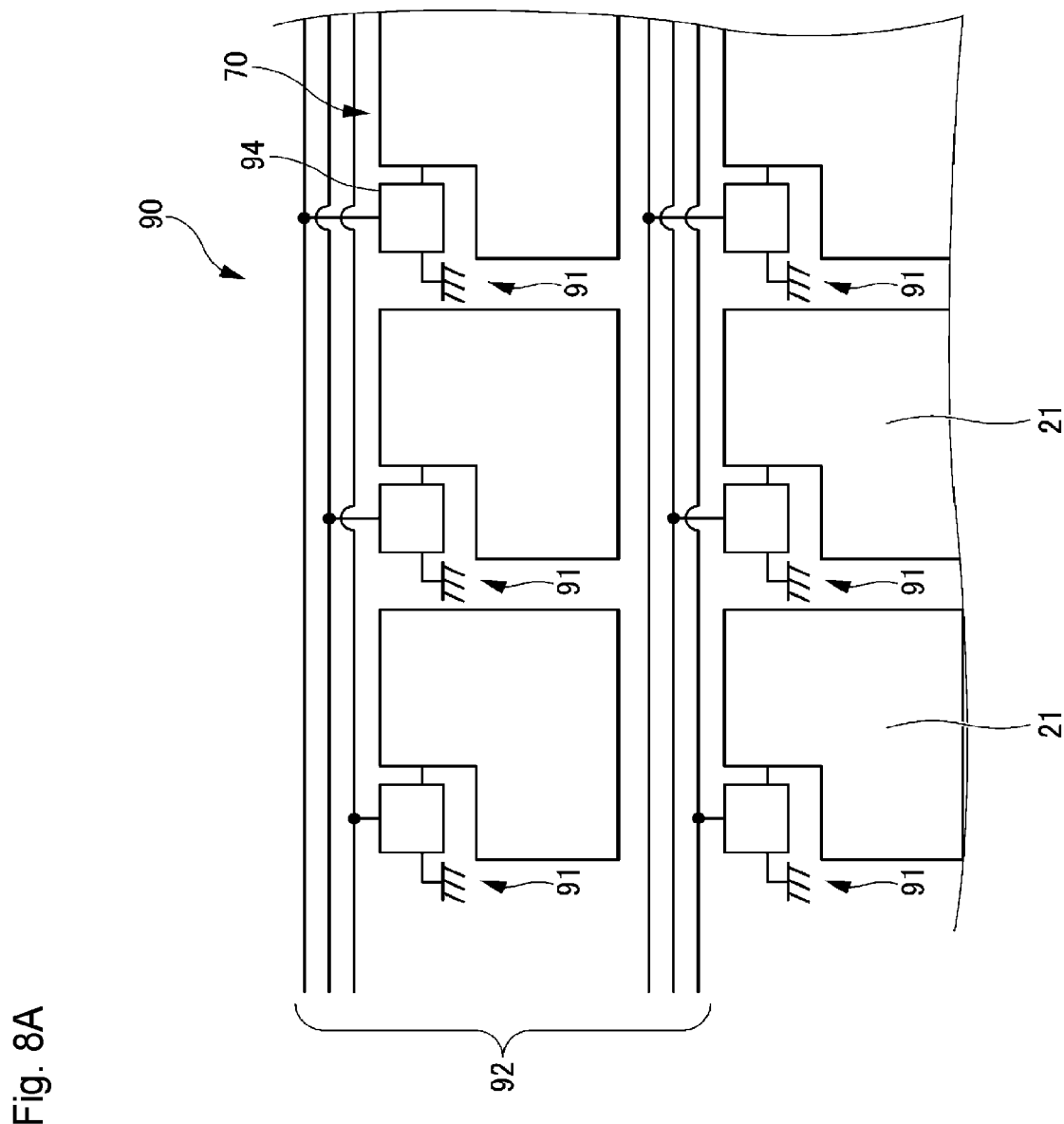
FIG. 8A is an illustrative view showing one example of a unit element and one example of a wiring according to the present invention.
Figures 8B, 9:
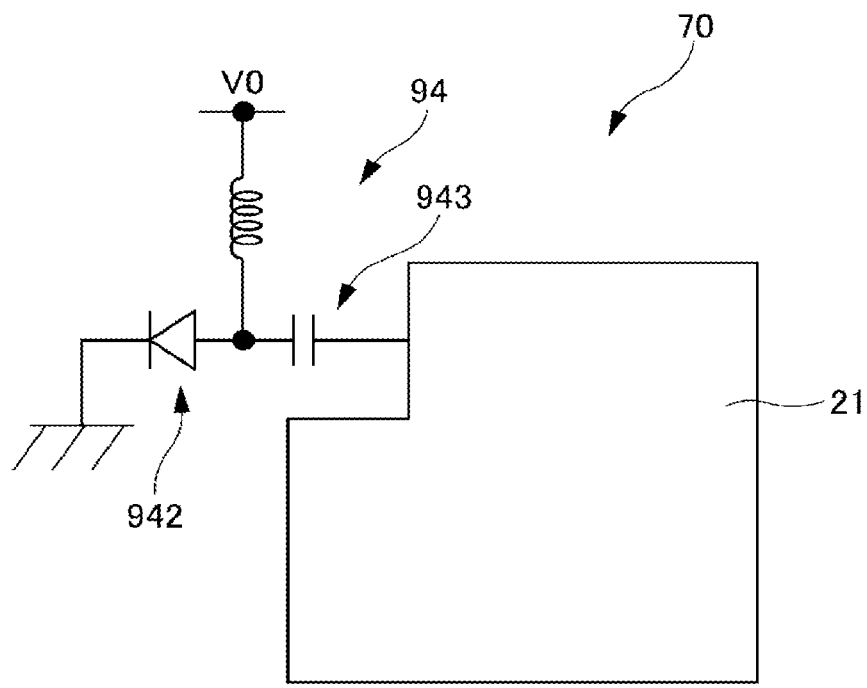
FIG. 8B is an illustrative view showing one example of the unit element (and a switching circuit included therein).
FIG. 9 is an illustrative view of map information for control.

FIG. 8A is an illustrative view showing one example of unit elements 70 and the wiring 90. FIG. 8B is an illustrative view showing one example of the switching circuit 94 of a unit element 70. In FIG. 8A, plural unit elements 70 are shown.

The unit elements 70 can function as the unit elements of a metasurface and are disposed in the respective conductors. Each single unit element 70 includes a single conductor 21 and a switching circuit 94 electrically connected to the single conductor 21. The respective unit elements 70 form the directivity control array 20 by being disposed in an array pattern so as to include the respective conductors 21.

The switching circuit 94 of each unit element 70 may be realized in any arbitrary mode. For example, in the case shown in FIG. 8B, the switching circuit 94 includes a diode 942 and a capacitive element 943. The diode 942 has a cathode electrically connected to ground and an anode electrically connected to its relevant conductor 21 through its relevant capacitive element 943. A power supply line 92 has one end electrically connected to a point between the diode 942 and the capacitive element 943. In this case, when the power supply voltage V0 is applied to the diode 942, the unit element 70 including this diode 942 (the conductor 21 and the switching circuit 94) functions as a metasurface. In contrast, when no voltage is applied to the diode 942, the unit element 70 including this diode 942 (the conductor 21 and the switching circuit 94) does not function as a metasurface. The switching circuit 94 may have a different configuration. For example, the switching circuit may include a semiconductor switching element, such as a transistor, or an MEMS (Micro Electro Mechanical Systems) switch. When a transistor is included, the transistor may be formed with its relevant conductor 21 as one body in the form of a thin film device.

In the following explanation, application of the power supply voltage V0 (or DC voltage) to a single unit element 70 means the application of the power supply voltage V0 (or DC voltage) to the diode 942 of this single unit element 70.

The wiring 90 is electrically connected to the power supply voltage V0 generated by the DC power supply generator 53. The wiring 90 is disposed to apply a DC voltage only to a certain one or certain ones among the unit elements 70. The wiring 90 is set such that there are plural kinds of patterns for applying a DC voltage to a desired one or desired ones among the unit elements 70 (see FIG. 9).

Specifically, the wiring 90 includes ground lines 91 and power supply lines 92. Each of the ground lines 91 and its paired power supply line 92 are connected to their corresponding unit element 70 through the switching circuit 94 of the corresponding unit element 70. The ground lines 91 are electrically connected to ground while the power supply lines 92 are electrically connected to the power supply voltage V0. In this case, when the power supply voltage V0 is applied to the switching circuit 94 of a unit element 70, the power supply voltage V0 is applied to the diode 942 of the switching circuit 94 of this unit element 70. The respective ground lines 91 may be electrically connected to the respective conductors 22 through via holes or the like, or may be disposed on the window glass 10 as in the power supply lines 92. When the ground lines 91 and the power supply lines 92 are disposed on the window glass 10, an insulating film or the like may be disposed in an area where a power supply line and a ground line 91 cross each other.

It should be noted that the power supply lines 92 may be disposed for the respective unit elements 70, or that a combination of unit elements 70 simultaneously applied at the power supply voltage V0 among the unit elements 70 (in other words, a combination of unit elements 70 simultaneously applied at the power supply voltage V0 in a voltage application pattern) may be electrically connected to a common power supply line 92.

The power supply lines 92 of the wiring 90 are preferably transparent as in the conductors 21. In this preferable mode, the power supply lines 92 can be disposed on the window glass 10 without significantly reducing the transmittance of the window glass 10 for visible light. In other words, the wiring 90 of the directivity control array 20 can be disposed, utilizing the window glass 10, without significantly reducing the transmittance of the window glass 10 for visible light.

Now, the relationship between the voltage application patterns and the directivities (reflection angles) achieved by the directivity control array 20 will be described in reference to FIG. 9 to FIG. 10D.

FIG. 9 is a view illustrating map information for control and illustrating one example of the relationship between instruction IDs and the voltage application patterns.

In FIG. 9, the instruction IDs are data included in the instruction indicating a directivity, and the voltage application patterns show the patterns of unit elements 70 to be applied with the DC voltage, among all of the unit elements 70. The voltage application patterns are prepared for the respective instruction IDs in a mode to be mapped to the respective instruction IDs. In FIG. 9, a voltage application pattern "Pattern A" is mapped to instruction ID "0001", and a voltage application pattern "Pattern B" is mapped to instruction ID "0002", for example. The number of the voltage application patterns may correspond to the number of the kinds of the directivities achieved by the directivity control array 20, and is preferably at least two kinds of directivities so as to realize various directivities.

Figure 10A:
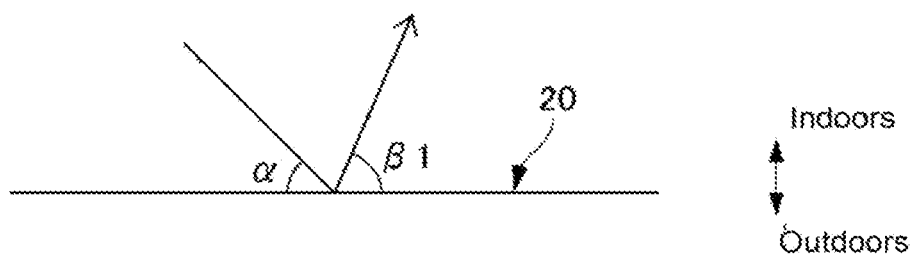
FIG. 10A is a view illustrating a difference (change) in reflection angles of the directivity control array achieved by a difference in voltage application patterns.
Figure 10B:
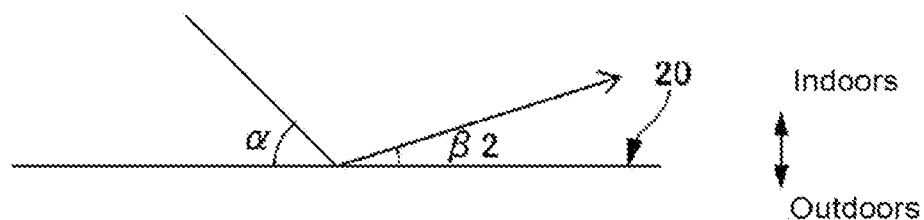
FIG. 10B is a view illustrating a difference (change) in the reflection angles of the directivity control array achieved by a difference in the voltage application patterns.
Figure 10C:
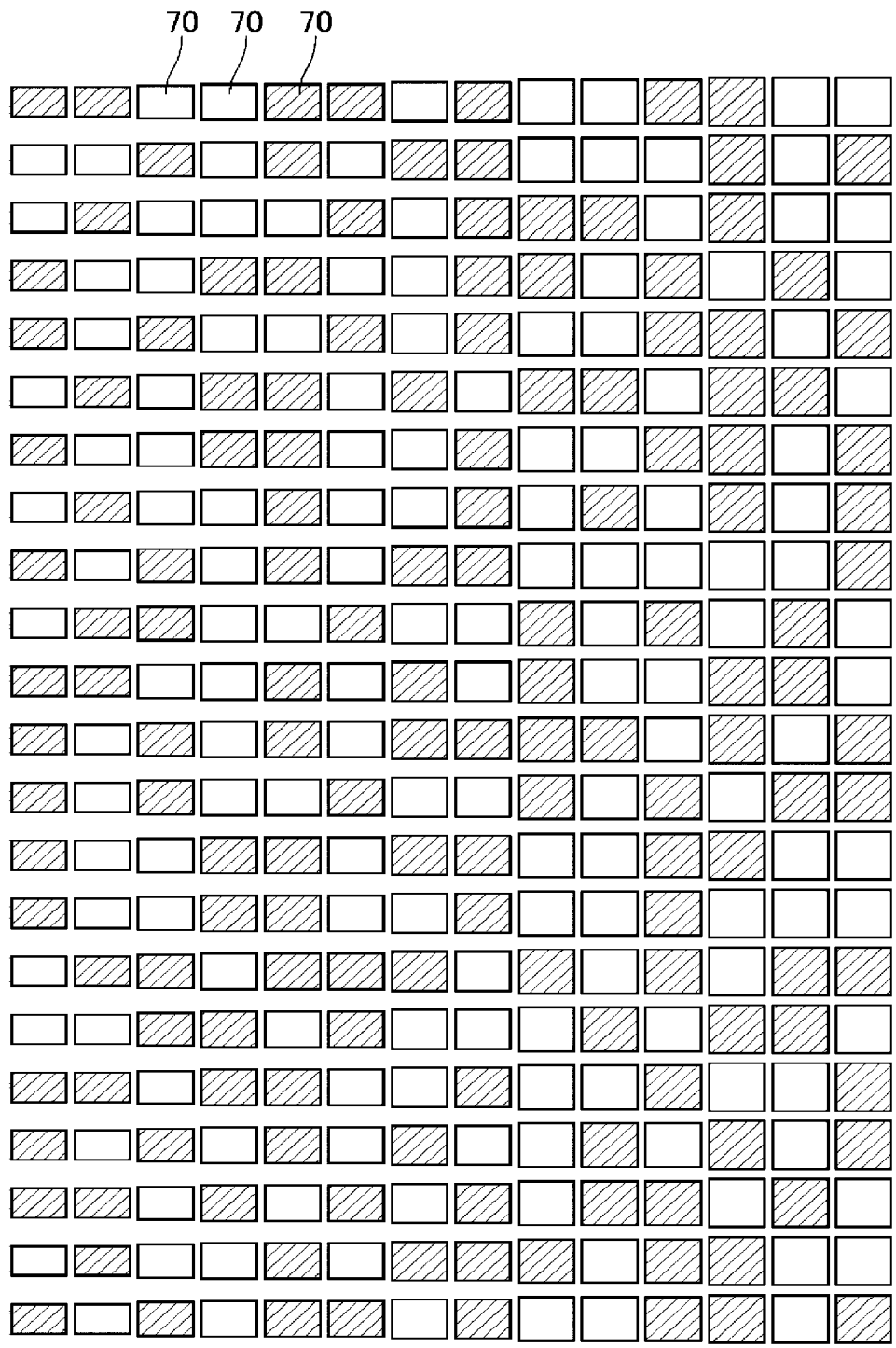
FIG. 10D is a view illustrating another voltage application pattern.

FIGS. 10A and 10B are views illustrating the difference (change) in reflection angles of the directivity control array 20 achieved by differences in voltage application patterns. FIGS. 10C and 10D are views illustrating voltage application patterns. FIGS. 10A and 10B are views illustrating reflection angles in the directivity control array 20 in a cross-sectional view of the window glass 10. In FIGS. 10C and 10D, each of the unit elements, some of which are shown in FIGS. 8A and 8B, is shown as a single rectangular unit in a quite schematic way. It should be noted that although the unit elements 70 are shown in FIGS. 10C and 10D to be disposed in the same size and shape at equal intervals for convenience of explanation, the conductors 21 may be formed based on parameters being settable in various ways as described above.

Figure 10D:
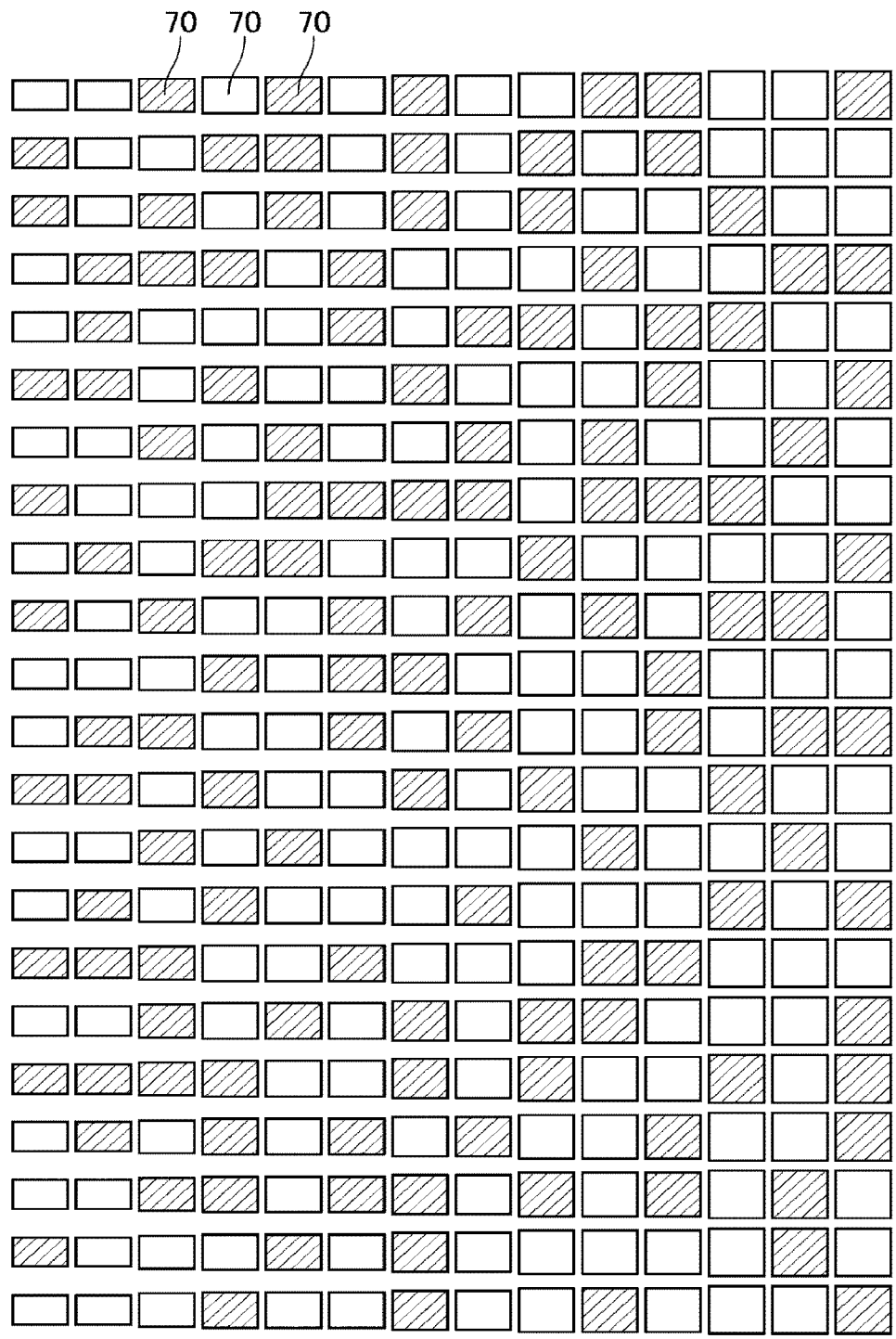

In FIGS. 10C and 10D, the unit elements with the DC voltage applied thereto among all of the unit elements 70 are hatched.

For convenience of explanation, it is supposed to that FIG. 10C corresponds to the voltage application pattern "Pattern A", and that FIG. 10A represents the reflection angle in the voltage application pattern "Pattern A". It is also supposed that FIG. 10D corresponds to the voltage application pattern "Pattern B", and that FIG. 10B represents the reflection angle in the voltage application pattern "Pattern B". In this case, with regard to "Pattern A", the unit elements 70 hatched in FIG. 10C among the unit elements 70 are mapped as the unit elements 70 to be applied with the DC voltage. Likewise, with regard to "Pattern B", the unit elements 70 hatched in FIG. 10D among the unit elements 70 are mapped as the unit elements 70 to be applied with the DC voltage.

In the cases shown in FIGS. 10A to 10D, when the voltage application pattern "Pattern A" is set, a radio wave that is incident to the directivity control array 20 at an incident angle of (90−α) is output from the directivity control array 20 at a reflection angle of (90−β1) as shown in FIG. 10A. When the voltage application pattern "Pattern B" is set, a radio wave that is incident to the directivity control array 20 at an incident angle of (90−α) is output from the directivity control array 20 at a reflection angle of (90−β2) as shown in FIG. 10B. In these cases, the formula of β1≠β2 is established.

In this way, the directivity control array 20 can change the voltage application patterns to vary the reflection angles. The reflection angles may be freely designed by controlling the phase difference of the conductor 21 of each of the unit elements 70 with the DC voltage applied thereto. For example, with regard to the voltage application pattern "Pattern A", the reflection angle of (90−β1) may be adjusted to a desired value by controlling the phase difference of the conductors 21 of each of the unit elements 70 with the DC voltage applied thereto (the respective unit elements 70 hatched in FIG. 10C) in the voltage application pattern "Pattern A". The phase difference of the conductor 21 of each of the unit elements 70 may be controlled by modifying the various parameters p1, p2, g1, g2 or the like of the conductors 21 described in reference to FIG. 6. Thus, this type of directivity control array 20 can adjust the reflection angles by modifying the various parameters p1, p2, g1, g2 or the like, making use of the properties of a meta-material or metasurface.

Although having the same incident angle (90−α), the reflection angles change according to voltage application patterns, which means that the directivity of a radio wave output from the directivity control array 20 changes according to voltage application patterns. Thus, this type of directivity control array 20 can adjust the directivity of each of the voltage application patterns by modifying the various parameters p1, p2, g1, g2 or the like. The voltage application patterns can be changed to dynamically vary the directivity.

Now, an example of the operation of the communication device 1 (example of the control of the directivity control array 20) according to this embodiment will be described in reference to FIG. 11.

Figure 11:
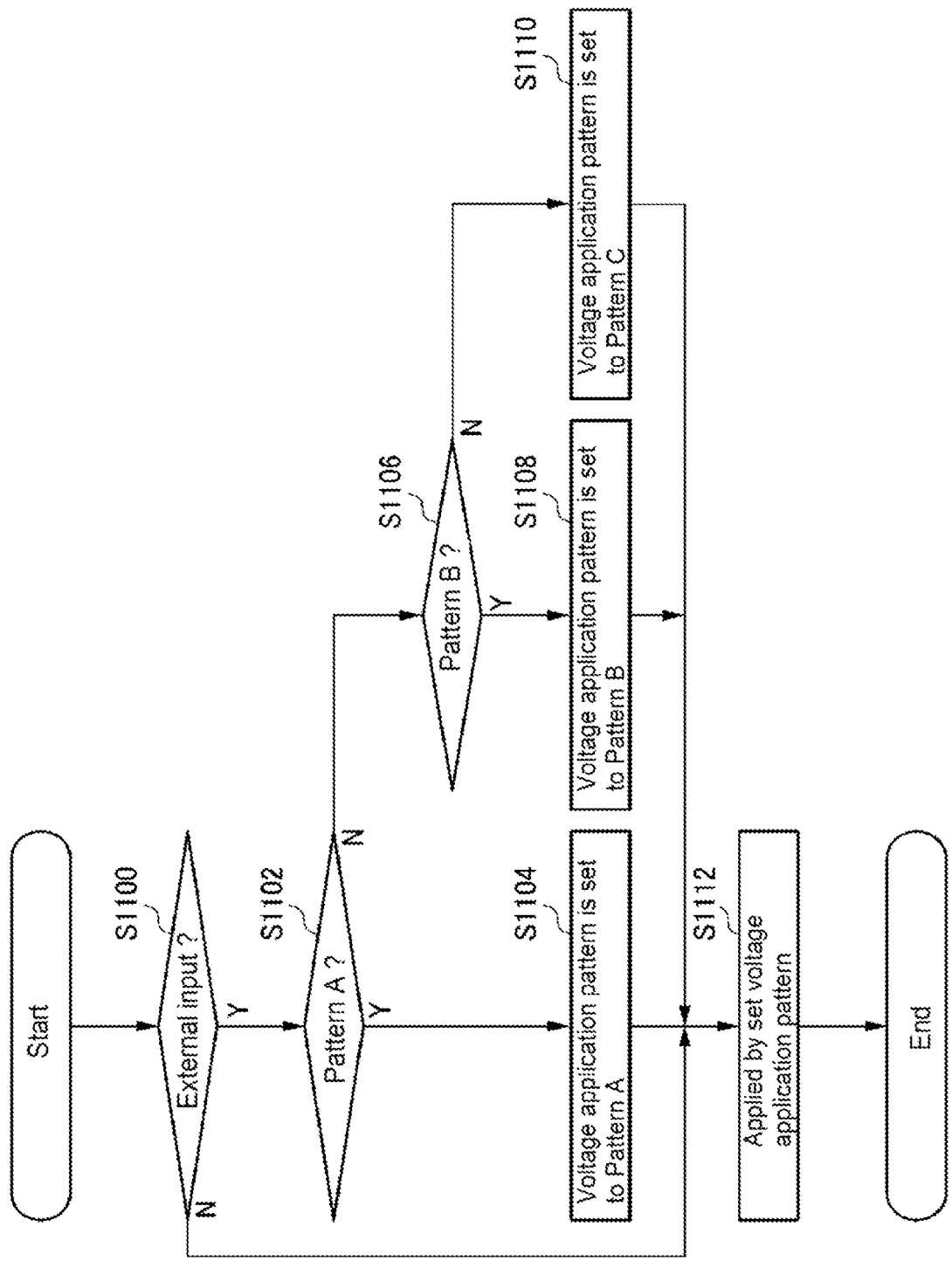
FIG. 11 is a flowchart illustrating one example of directivity control processing performed by a microcomputer.

FIG. 11 is a flowchart illustrating one example of the directivity control processing performed by the MICOM 51. In the one example shown in this figure, it is supposed that only three patterns of "Pattern A" to "Pattern C" are prepared as the voltage application patterns.

At Step S1100, the MICOM 51 determines whether an external input (instruction indicating a directivity) is received or not. The external input may be an input from an arbitrary external device, for example an input from the user terminal U1. When the determination result is "YES", the process goes to Step S1102. Otherwise, the process goes to Step S1112.

At Step S1102, the MICOM 51 determines whether the instruction ID included in the instruction indicating a directivity is "0001" (see FIG. 9) or not. In other words, the MICOM 51 determines whether "Pattern A" is instructed or not. When the determination result is "YES", the process goes to Step S1104. Otherwise, the process goes to Step S1106.

At Step S1104, the MICOM 51 sets the voltage application pattern to "Pattern A". It should be noted that the initial value (default value) of the voltage application patterns may be set to, e.g., "Pattern A".

At Step S1106, the MICOM 51 determines whether the instruction ID included in the instruction indicating a directivity is "0002" (see FIG. 9) or not. In other words, the MICOM 51 determines whether "Pattern B" is instructed or not. When the determination result is "YES", the process goes to Step S1108. Otherwise (in other words, when "Pattern C" is instructed), the process goes to Step S1110.

At Step S1108, the MICOM 51 sets the voltage application pattern to "Pattern B".

At Step S1110, the MICOM 51 sets the voltage application pattern to "Pattern C".

At Step S1112, the MICOM 51 controls the DC voltage to be applied to unit elements 70, based on the voltage application pattern set at present. For example, when the voltage application pattern set at present is "Pattern A", the MICOM 51 applies the DC voltage to the unit element or unit elements 70 mapped to "Pattern A", among all of the unit elements 70.

In this way, the processing shown in FIG. 11 can vary the voltage application patterns and, consequently, the directivity of the directivity control array 20 in accordance with the external output (instruction indicating a directivity). Thus, the directivity of the directivity control array 20 can be adjusted so as to have a directivity matched to the indoor location of the user terminal U1 by, for example, inputting an external input (instruction indicating a directivity) matched to the indoor location of the user terminal U1.

Although it is exemplified in the above-mentioned embodiment that the external user terminal U2 is a receiver communicating with the user terminal U1, the object communicable with the user terminal U1 by use of the communication device 1 is arbitrary. For example, the user terminal U1 can communicate with various servers by use of the communication device 1. It should be noted that the external user terminal U2 (the user terminal U1 as well) may be an arbitrary terminal having a communication function, such as a smartphone, a tablet, a PC (personal computer), a gaming machine, a wearable device.

In accordance with the embodiment mentioned above, in particular, the following excellent advantages are achieved.

In accordance with this embodiment, since the directivity control array 20 can be disposed by utilizing a window glass 10 as mentioned above, a window glass already provided in a building BD or the like can be utilized to avoid the necessity of preparing a dielectric base material other than the window glass 10. In a modification, the directivity control array 20 may be disposed by utilizing, as the base material, a portion of a partition plate or wall placed in a room or the like.

When the directivity control array 20 is disposed, making use of a transparent base material, such as the window glass 10, it is effective to dispose the directivity control array 20 without impairing essential functions of the window glass 10. For example, when the conductors 21 or the like that form part of the directivity control array 20 are not transparent, it is likely to impair the essential functions of the window glass 10 in a comparatively significant way.

In this regard, in accordance with this embodiment, since the transparent conductors 21 and 22 are disposed as mentioned above, the conductors 21 and 22 can be disposed on the window glass 10 without significantly reducing the transmittance of the window glass 10 for visible light. When the power supply lines 92 of the wiring 90 are transparent, the wiring 90 can be disposed on the window glass 10 without significantly reducing the transmittance of the window glass 10 for visible light. Thus, the directivity control array 20 can be disposed, making use of the window glass 10, without impairing the essential functions of the window glass 10.

In this embodiment, when the processor 50 is partially or fully disposed at an invisible place, such as inside of a wall, it is possible to prevent the deterioration in appearance caused by the structure required for controlling the directivity control array 20. For example, the DC power supply generator 53 is disposed outside the window glass 10 (for example, in the sash 7), and when wires and so on connecting between the DC power supply generator 53 and the wiring 90 for applying the DC voltage to the unit elements 70 forming the directivity control array 20 are routed, making use of the sash 7, it is possible to dispose the directivity control array 20, making use of the window glass 10, without impairing appearance.

In accordance with this embodiment, it is possible to reduce the problem of insensitive areas since a user terminal U1 present at an insensitive area can communicate with an external user terminal U2 as described above. In particular, when the used frequencies become higher toward realization of future high-speed broadband communication systems, the problem of insensitive areas would become significant since higher frequencies generate the occurrence of insensitive areas. In this regard, this embodiment can ensure a good communication environment in an insensitive area, making use of an existing object, such as a window glass 10.

Although the directivity control array 20 according to this embodiment is configured to output a radio wave toward indoors based on a radio wave incident from the indoor antenna unit 40, the directivity control array is not limited to have such a configuration. For example, the directivity control array may be configured as in a directivity control array 20B shown in FIG. 13 such that the antenna unit 40 is disposed outdoors (see the antenna unit 40B shown in this figure with regard to the arrangement), and that the directivity control array outputs a radio wave toward outdoors based on a radio wave incident from the outdoor antenna unit 40. Such a configuration is appropriate in, e.g., a case where the user terminal U1 is present not inside but outside a building BD, such as at a street in front of the building BD (in particular, a street in an insensitive area) (not inside the building BD). In other words, the communication device 1 may be also configured so as to work for an insensitive area outside the building BD.

When an attempt is made to adopt an arrangement where a radio wave is radiated toward indoors directly from the antenna unit 40 without disposing the directivity control array 20 (in other words, an arrangement where a radio wave is radiated toward indoors), it is difficult, in terms of the Radio Act or the like, to radiate a radio wave so as to cover a wide range in a room. When an attempt is made to cause a radio wave to cover a wide range in a room in such an arrangement, the radio wave could be reflected by a wall or the like (the presence of a delayed incident radio wave leads to a reduction in S/N ratio) to cause an interference problem or the like.

In this regard, this embodiment can use the directivity control array 20 to reduce the above-mentioned inconvenience caused by the arrangement where a radio wave is radiated toward indoors directly from the antenna unit 40. Further, the directivity of the directivity control array 20 can be dynamically controlled according to the location of e.g., the user terminal U1. In this case, it is possible to realize a similar effect to beamforming.

Embodiment 2

Now, Embodiment 2 will be described. With regard to this embodiment, the elements that may be identical or similar to those of the above-mentioned Embodiment 1 are denoted with like reference numerals, and explanation of those elements will be omitted on some occasions.

Figure 12:
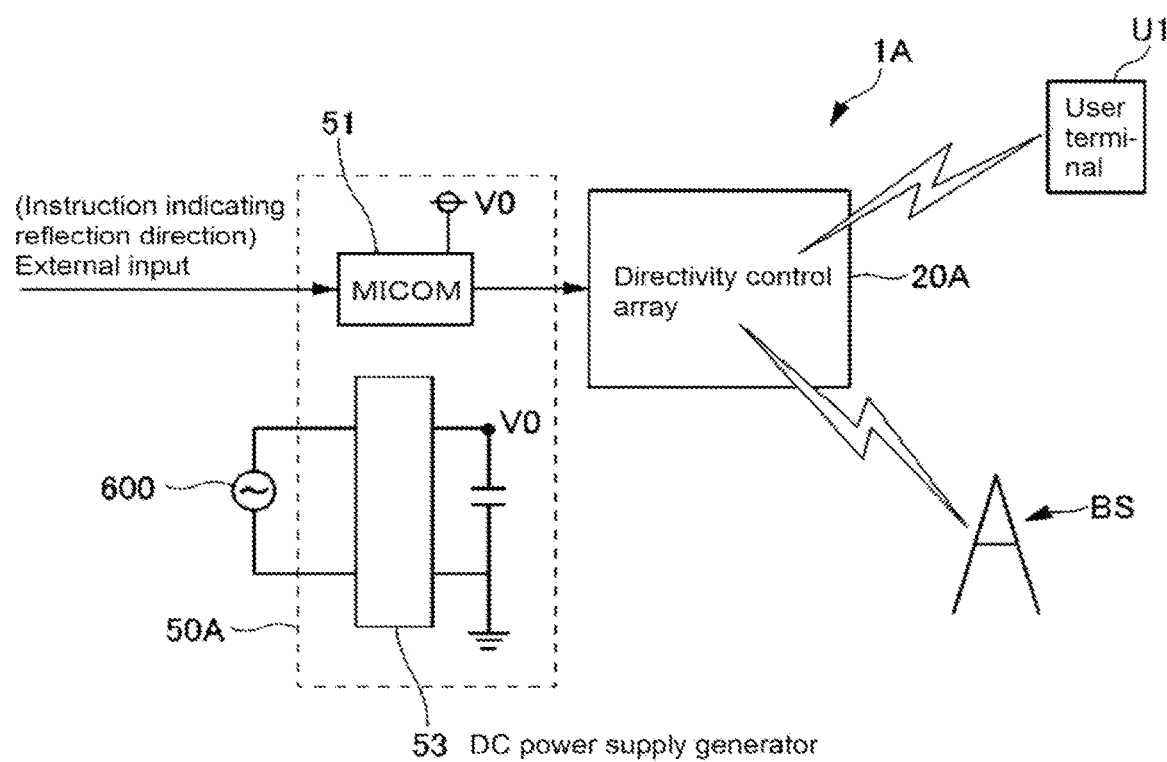
FIG. 12 is a view schematically illustrating a control system related to the communication device according to Embodiment 2 of the present invention, and how communication is made by using the communication device.

FIG. 12 is a view schematically illustrating a control system related to the communication device 1A according to this embodiment, and how communication is made by using the communication device 1A.

The communication device 1A according to Embodiment 2 is different from the communication device 1 according to the above-mentioned Embodiment 1 in that no antenna unit 40 is included, that the directivity control array 20 is substituted with a directivity control array 20A, and that the processor 50 is substituted with a processor 50A.

The processor 50A is different from the processor 50 according to the above-mentioned Embodiment 1 in that no communication circuit 52 is included.

The directivity control array 20A is a reflect array. The directivity control array 20A has the same structure and arrangement as those of the directivity control array 20 according to the above-mentioned Embodiment 1 and is different from the directivity control array 20 in terms of function. Specifically, the directivity control array 20 according to the above-mentioned Embodiment 1 interposes in the transmission and reception of a radio wave between the antenna unit 40 and the user terminal U1 while the directivity control array 20A interposes in the transmission and reception of a radio wave between a base station BS and a user terminal U1. In other words, the directivity control array 20A functions as a repeater between the base station BS and the user terminal U1.

It should be noted that in this embodiment, the directivity control array 20A may have unit elements 70 disposed on an outer side of the window glass 10, which is opposite in terms of the arrangement of the conductors 21 and the conductor 22 on the inner and outer sides in the directivity control array 20 according to the above-mentioned Embodiment 1.

The communication device 1A according to Embodiment 2 is appropriate to e.g., a case where the user terminal U1 is present not inside but outside the building BD, such as at a street in front of the building BD (in particular, a street in an insensitive area).

In reception, when a radio wave is incident from the base station BS, the directivity control array 20A outputs a reflection wave based on the radio wave. For example, the base station BS radiates a radio wave carrying transmission data from an external user terminal U2. Thus, the user terminal U1 can receive the reflection wave from the directivity control array 20A to receive the transmission data from the external user terminal U2 in this case.

In transmission, when a radio wave from the user terminal U1 is incident on the directivity control array 20A, the directivity control array 20A outputs a reflection wave toward the base station BS based on the radio wave. For example, the user terminal U1 radiates a radio wave carrying transmission data to be transmitted to the external user terminal U2 as mentioned above, and the radio wave is incident on the directivity control array 20A. Thus, the base station BS can receive the reflection wave from the directivity control array 20A to transmit the transmission data to the external user terminal U2 in this case.

In this way, the user terminal U1 can communicate with the external user terminal U2 through the directivity control array 20A and the base station BS in this embodiment as well. Specifically, communication can be established between the user terminal U1 (the user terminal U1 being present outside the building BD in this embodiment) and the external user terminal U2 by utilizing the directivity control array 20A disposed by making use of the window glass 10. Thus, the communication device 1 functions as a base station device such that the user terminal U1 can communicate with the external user terminal U2 even when the user terminal U1 is present in an insensitive area as described above.

Embodiment 3

Now, Embodiment 3 will be described. With respect to this embodiment, the elements that may be identical or similar to those of the above-mentioned Embodiment 1 are denoted with like reference numerals, and explanation of those elements will be omitted on some occasions.

Figure 13:
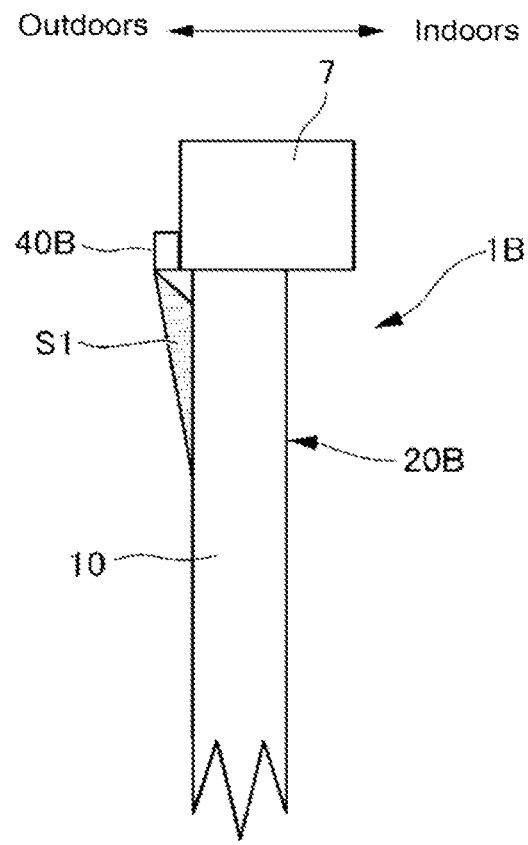
FIG. 13 is a view illustrating the communication device according to Embodiment 3 of the present invention.

FIG. 13 is a view illustrating the communication device 1B according to this embodiment and a schematically illustrating this embodiment as viewed in the direction of the arrow A1 in FIG. 2.

The communication device 1B according to Embodiment 3 is different from the communication device 1 according to the above-mentioned Embodiment 1 in that the directivity control array 20 is substituted with a directivity control array 20B, and that the antenna unit 40 is substituted with an antenna unit 40B.

The directivity control array 20B is different from the directivity control array 20 according to the above-mentioned Embodiment 1 in that the former is not of a reflection type but a transmission type. In other words, the directivity control array 20B is configured to radiate a radio wave toward indoors based on a radio wave incident from outdoors. The transmission type of array may be configured by modifying the various parameters p1, p2, g1, g2 or the like related to a plurality of conductors 21, making use of the properties of a meta material or meta surface as in the reflection type of array. In other words, the array including a plurality of unit elements 70 (array with a conductor 22 disposed on a rear side) can be freely designed as a reflection type or a transmission type by modifying the various parameters p1, p2, g1, g2 or the like.

The antenna unit 40B is different from the antenna 40 according to the above-mentioned Embodiment 1 in that the antenna unit 40B is disposed so as to cause a radio wave incident on the directivity control array 20B from outdoors. The antenna unit 40B may be disposed on, e.g., an outer side of a sash 7 as shown in FIG. 13. In this case, the directivity control array 20B radiates a radio wave toward indoors based on a radio wave incident through the window glass 10 from outdoors.

Figure 14A:
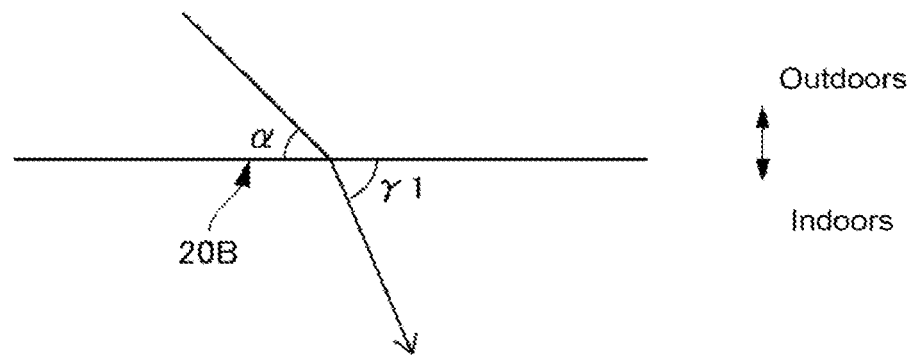
FIG. 14A is a view illustrating a refraction angle in a directivity control array in a cross-sectional view of a window glass.
Figure 14B:
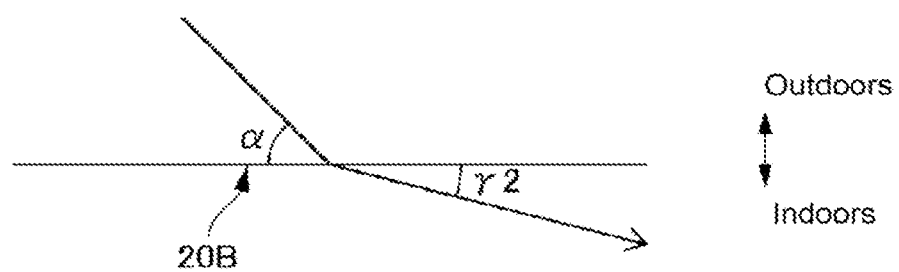
FIG. 14B is a view illustrating a refraction angle in the directivity control array in a cross-sectional view of the window glass.

FIGS. 14A and 14B are views illustrating refraction angles in the directivity control array 20B in a cross-sectional view of the window glass 10.

The directivity control array 20B is configured such that even when radio waves incident from outdoors have an identical incident angle of $(90-\alpha)$, the radio waves have different refraction angles according to differences in the voltage application patterns as schematically shown in FIGS. 14A and 14B.

Specifically, it is supposed that FIG. 14A represents the refraction angle in the voltage application pattern "Pattern A" while FIG. 14B represents the refraction angle in the voltage application pattern "Pattern B". In this case, when the voltage application pattern "Pattern A" is set, a radio wave that is incident to the directivity control array 20B at an incident angle of $(90-\alpha)$ is output from the directivity control array 20B at a refraction angle of $(90-\gamma 1)$ as shown in FIG. 14A. When the voltage application pattern "Pattern B" is set, a radio wave that is incident to the directivity control array 20B at an incident angle of $(90-\alpha)$ is output from the directivity control array 20B at a refraction angle of $(90-\gamma 2)$ as shown in FIG. 14B. In these cases, the formula of $\gamma 1 \neq \gamma 2$ is established.

In this way, the directivity control array 20B can change the voltage application patterns to vary the refraction angles. The reflection angles may be freely designed by controlling the phase difference of the conductor 21 of each of the unit elements 70 with the DC voltage applied thereto. For example, with regard to the voltage application pattern "Pattern A", the refraction angle of $(90-\gamma 1)$ may be adjusted to a desired value by controlling the phase difference of the conductors 21 of each of the unit elements 70 with the DC voltage applied thereto (the respective unit elements 70 hatched in FIG. 10C) in the voltage application pattern "Pattern A". Thus, this type of directivity control array 20B can adjust the refraction angles by modifying the various parameters p1, p2, g1, g2 or the like, making use of the properties of a meta-material or metasurface.

Although having the same incident angle $(90-\alpha)$, the refraction angles change according to voltage application patterns, which means that the directivity of a radio wave output from the directivity control array 20B changes according to voltage application patterns as in the case of reflection. Thus, this type of directivity control array 20B can modify the various parameters p1, p2, g1, g2 or the like of the conductors 21 to adjust the directivity for each of the voltage application patterns. The voltage application patterns can be changed to dynamically vary the directivity.

This embodiment can achieve a similar effect to the above-mentioned Embodiment 1 since the window glass 10 can be made use of as the base material to dispose the above-mentioned transmission type of directivity control array 20B as described above.

The transmission type of directivity control array 20B according to this embodiment may be utilized in place of the above-mentioned directivity control array 20A according to Embodiment 2. In this case, the above-mentioned Embodiment 2 is appropriate to a case where a user terminal U1 is present indoors as in the above-mentioned Embodiment 1.

Now, the results of simulations performed by the inventors will be described in reference to FIG. 16 and its subsequent figures. Although explanation will be made on the simulated results about the above-mentioned directivity control array 20 according to Embodiment 1, the explanation is also substantially applicable to the other embodiments.

Figure 16:
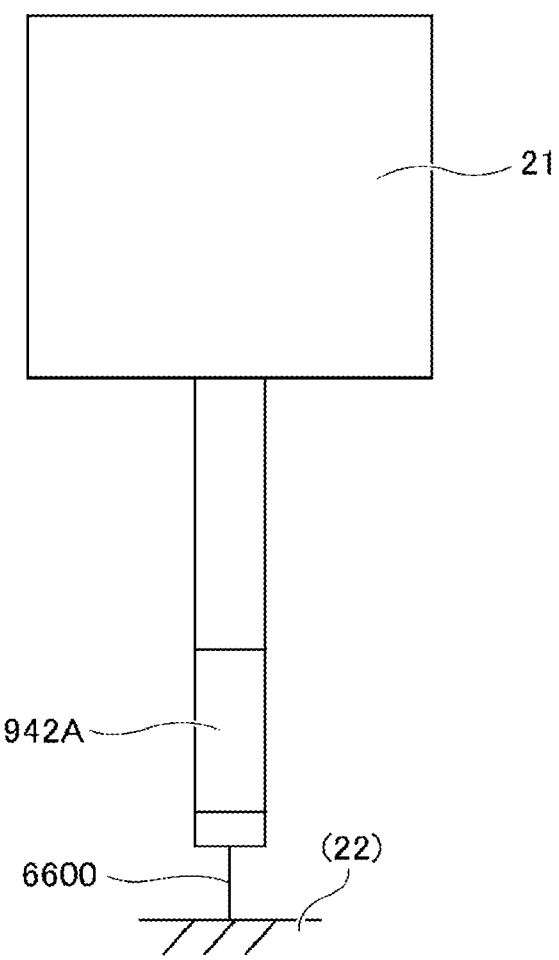
FIG. 16 is a view illustrating a model used in a simulation.
Figure 17:
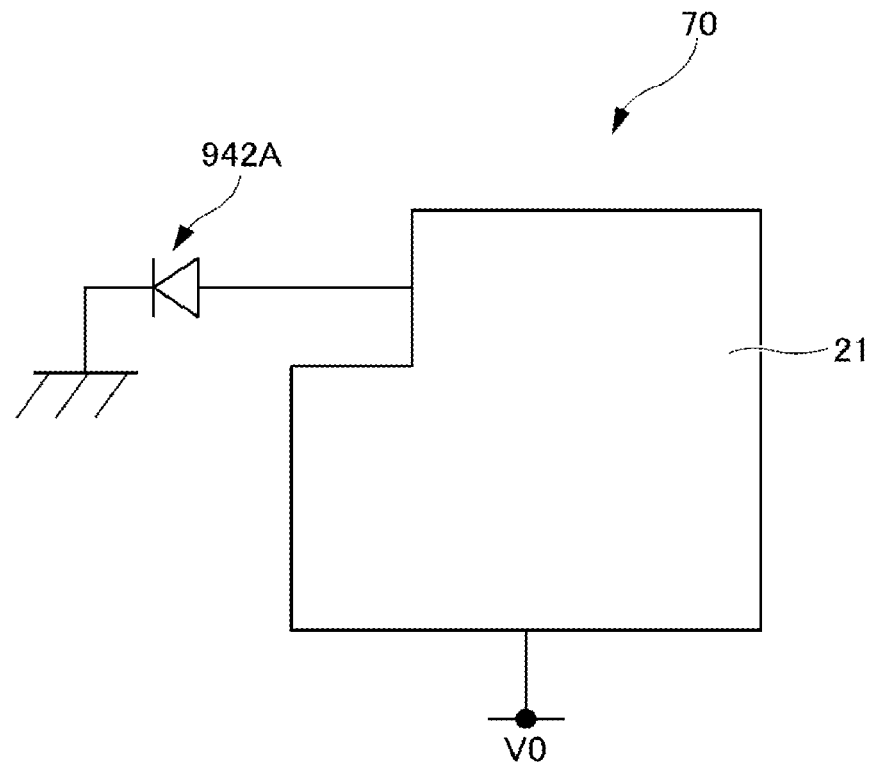
FIG. 17 is another view illustrating the model used in the simulation.

FIGS. 16 and 17 are views illustrating the model used in this simulation, wherein a portion of the model related to a single unit element 70 being shown. In this simulation, the unit elements 70 of the model were disposed in an array of 8×8, though not shown. In this simulation, the calculation was made with the frequency (operation frequency) of a radio wave incident on the array of 8×8 being set at 28 GHz and with the polarization direction being an elevation direction. The array had a pitch set at 0.5λ in an azimuth direction (see parameter p2 in FIG. 6) and a pitch set at 0.5λ in the elevation direction (see parameter p1 in FIG. 6). The base material corresponding to the window glass 10 had a constant thickness in the simulation. In the designed example, the frequency band (bandwidth) of a radio wave that can achieve the effect described later can be widened as the thickness increases.

In this simulation, the model was configured such that the conductor 21 of a single unit element 70 is grounded through a PIN diode 942A. This configuration may be achieved by electrically connecting the conductor 21 to the conductor 22 (see FIG. 7) through a through hole (via) 6600.

Figure 18A:
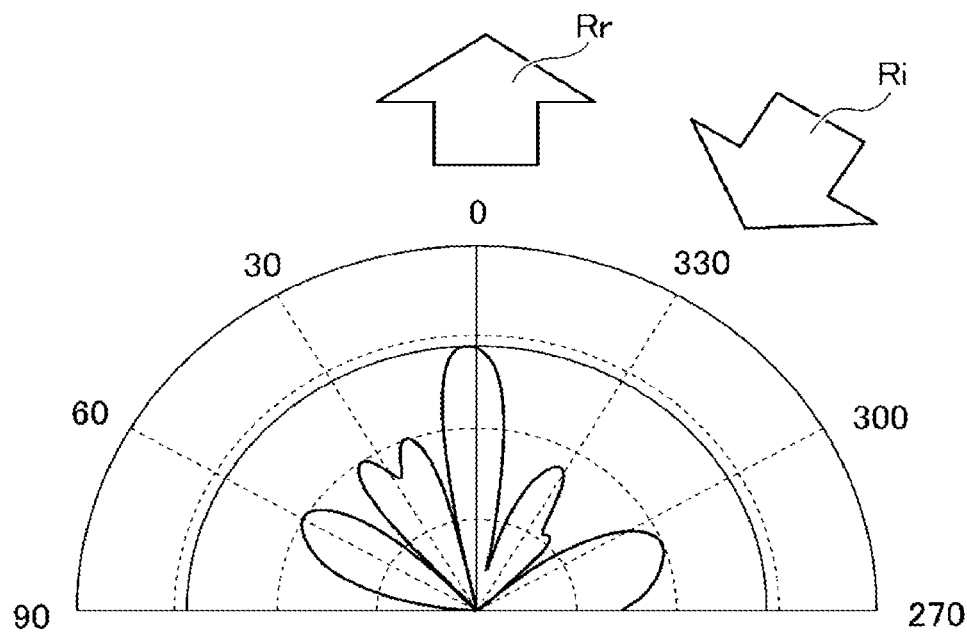
FIG. 18A is a view illustrating a simulated result when a specific voltage application pattern was applied.
Figure 18B:
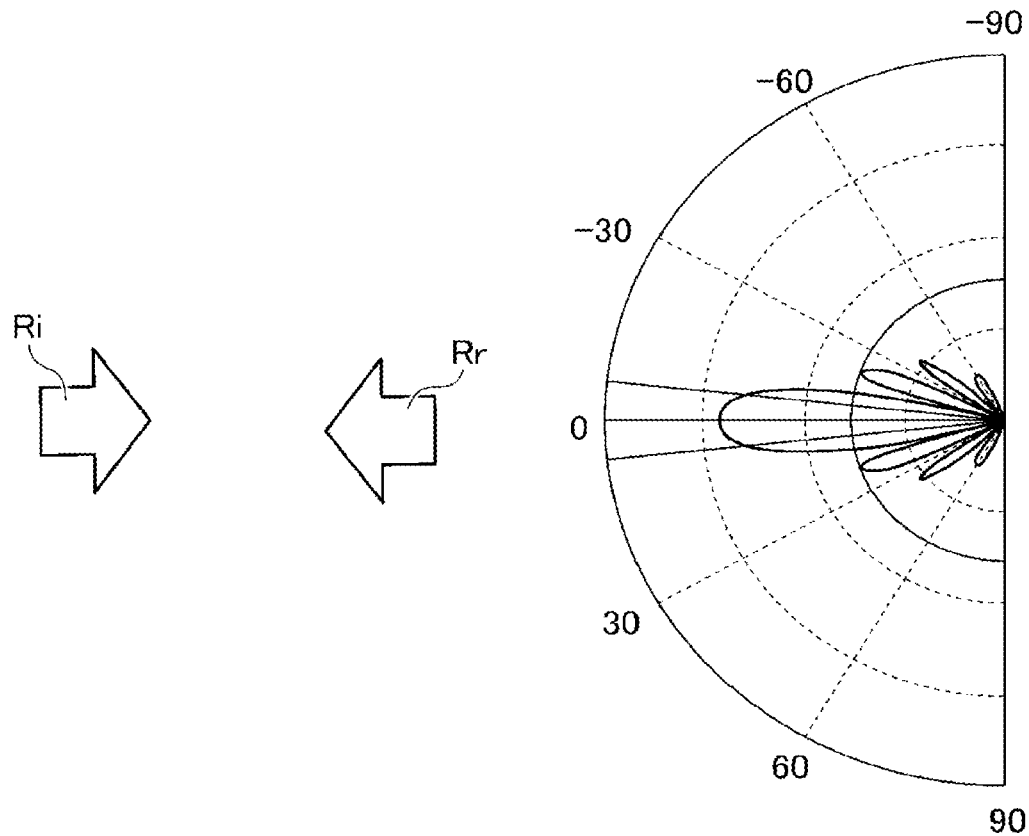
FIG. 18B is another view illustrating the simulated result when the specific voltage application pattern was applied.
Figure 18C:
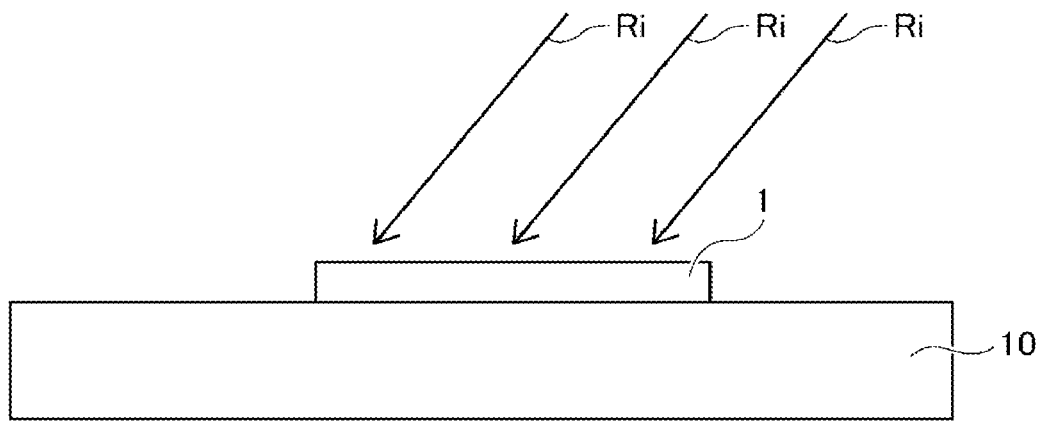
FIG. 18C is another view illustrating the simulated result when the specific voltage application pattern was applied.
Figure 18D:
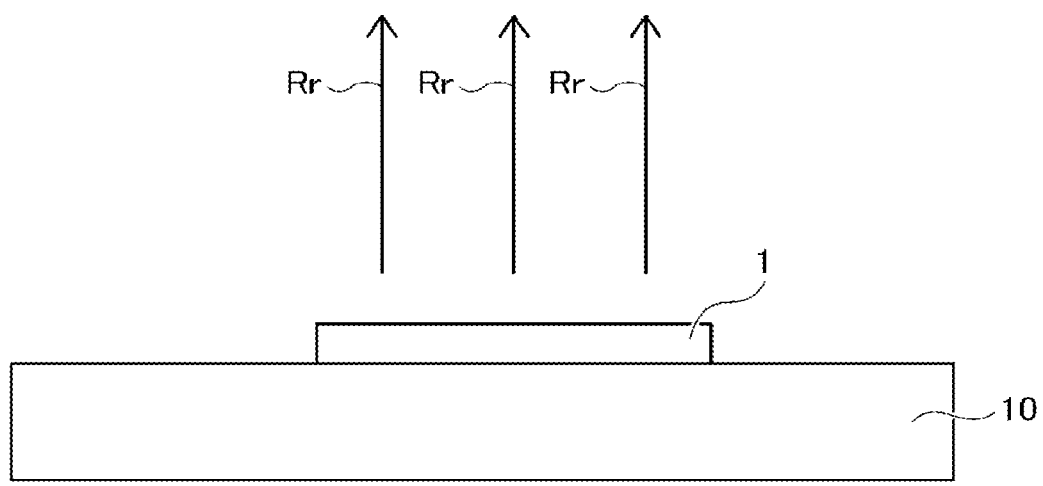
FIG. 18D is another view illustrating the simulated result when the specific voltage application pattern is applied.

FIGS. 18A to 18D are views illustrating simulated results when the voltage application pattern shown in FIG. 18E was applied. In FIG. 18A, the characteristics (unit: dB m$^2$, hereinafter the same) of the RCS (Radar Cross Section) in the azimuth direction is illustrated by an angular range on the opposite side. In FIG. 18B, the characteristics of the RCS in the elevation direction is illustrated by an angular range on the opposite side. As schematically shown in FIG. 18A, the radio wave was incident on the array of 8×8 unit elements 70 from a direction of −30 degrees (330 degrees) with respect to the reference direction in the azimuth direction (direction of 0 degree) (see FIG. 18C). In the elevation direction, the radio wave was incident on the array from the reference direction (direction of 0 degree). In FIGS. 18A and 18B, the incident wave of the radio wave is schematically indicated by arrows Ri while the reflection wave is schematically indicated by arrows Rr (These indications are also applicable to FIG. 19A, FIG. 19B etc. as subsequent similar figures). It should be noted that in FIG. 18C (also applicable to FIG. 18D), the incident direction of the radio wave to the communication device 1 (the reflection direction of the radio wave to the communication device 1 in FIG. 18D) is indicated by similar arrows Ri (similar arrows Rr). In this case, the communication device 1 represents the entire device including the array of 8×8 unit elements 70. These items are also applicable to subsequent similar figures (such as FIG. 19C and FIG. 19D).

FIG. 18E illustrates how a voltage was applied to the respective unit elements 70 in the array of 8×8 unit elements 70 when the lateral direction and the vertical direction corresponded to the azimuth direction and the elevation direction, respectively. The voltage application state includes two kinds of "ON" and "OFF", and "ON" and "OFF" mean a state with a DC voltage being applied and a state with no DC voltage being applied, respectively. The reflection phase in the unit elements in the "ON" state and the reflection phase in the unit elements in the "OFF" state were designed so as to be shifted by 180 degrees. For example, in the example shown in FIG. 18E, the unit elements 70 in the first, second, fifth and sixth rows from left in the azimuth direction were all set to "OFF" while the unit elements 70 in the remaining rows were all set to "ON". Such representation is also applicable to FIG. 19E and FIG. 20E referred to later.

In a case where the voltage application pattern shown in FIG. 18E was applied, when a radio wave was incident from a direction forming an angle of −30 degrees with the reference direction (direction of 0 degree) in the azimuth direction, the simulated results showed characteristics that the reflection wave toward the reference direction (direction of 0 degree) in the azimuth direction was stronger as shown in FIGS. 18A to 18D. When a radio wave is incident on a simple metal plate from a direction (330 degrees) forming an angle of −30 degrees with the reference direction (direction of 0 degree) in the azimuth direction, characteristics that reflection toward a direction (30 degrees) forming an angle of 30 degrees with the reference direction in the reference direction (direction of 0 degree) is stronger is obtained. This reveals that the directivity control array 20 according to the above-mentioned Embodiment 1 can achieve the reflection characteristics that cannot be achieved by a simple metal plate.

Figure 19A:
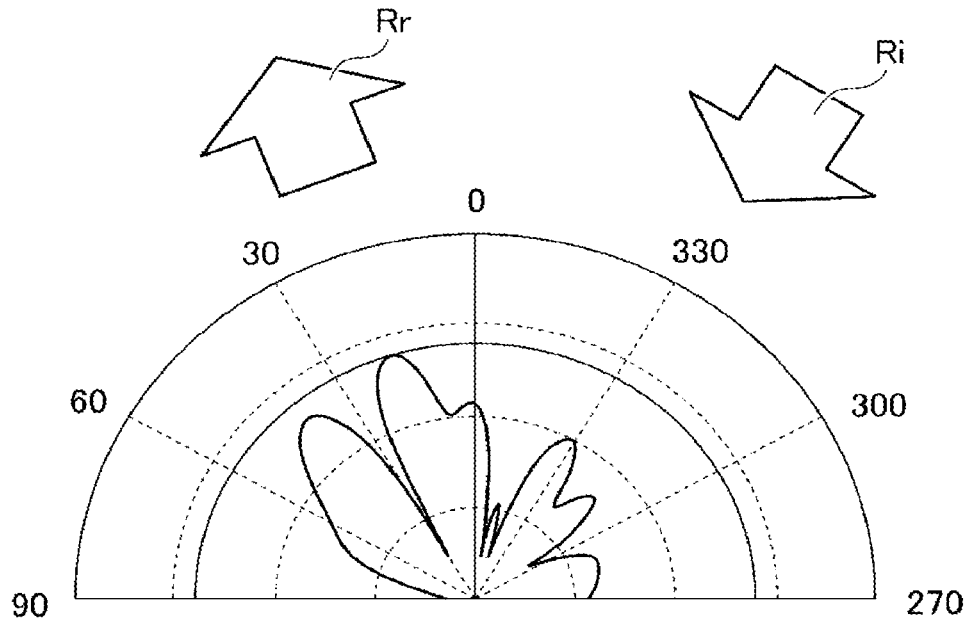
FIG. 19A is a view illustrating a simulated result when another specific voltage application pattern was applied.
Figure 19B:
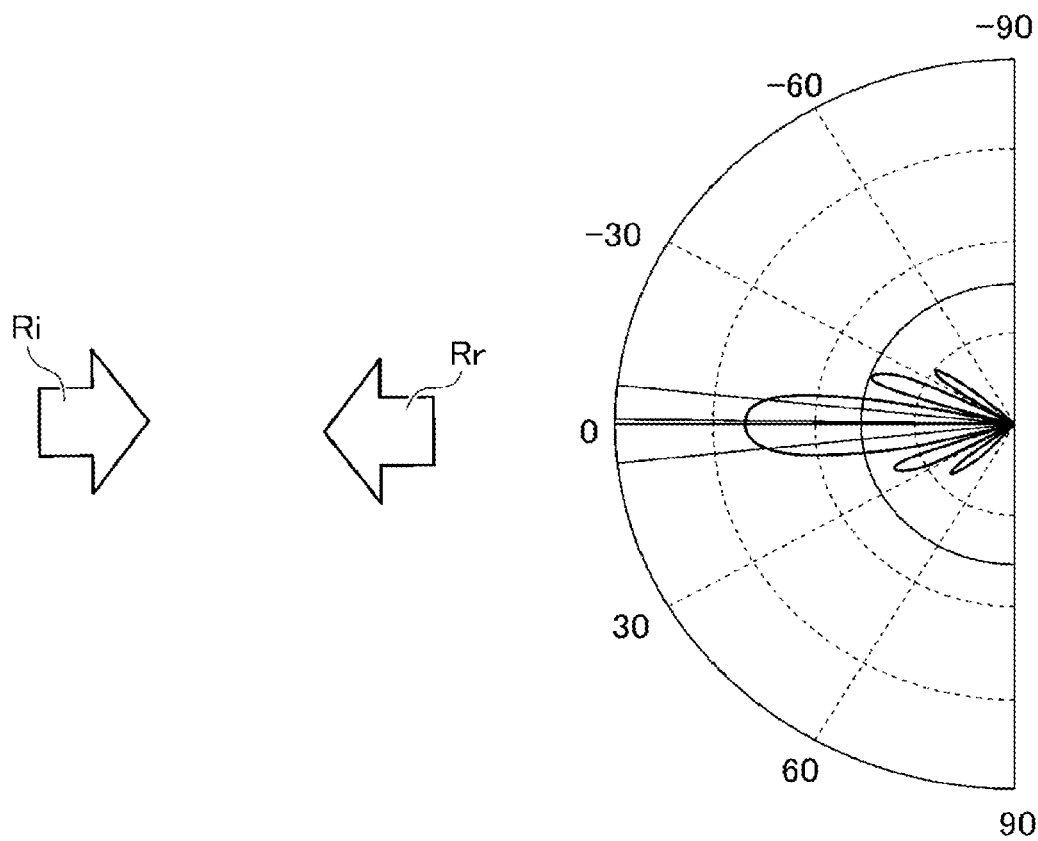
FIG. 19B is another view illustrating the simulated result when the specific voltage application pattern was applied.
Figure 19C:
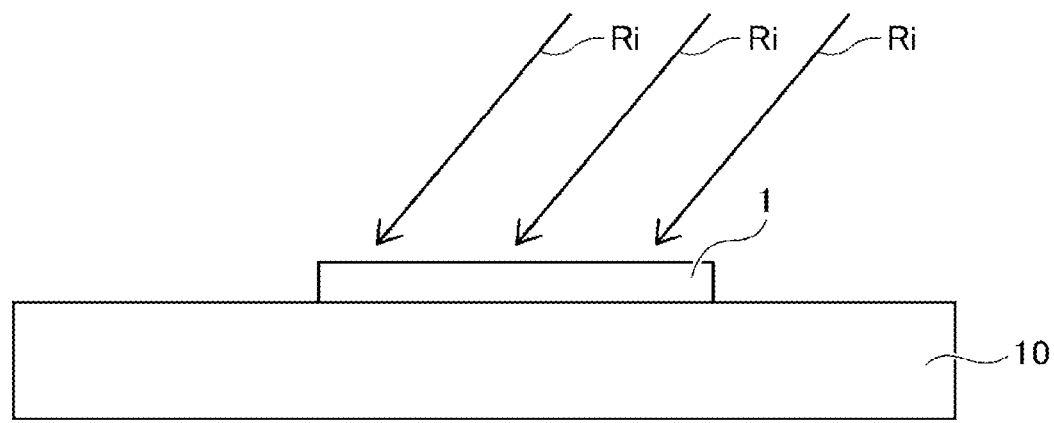
FIG. 19C is another view illustrating the simulated result when the specific voltage application pattern was applied.
Figure 19D:
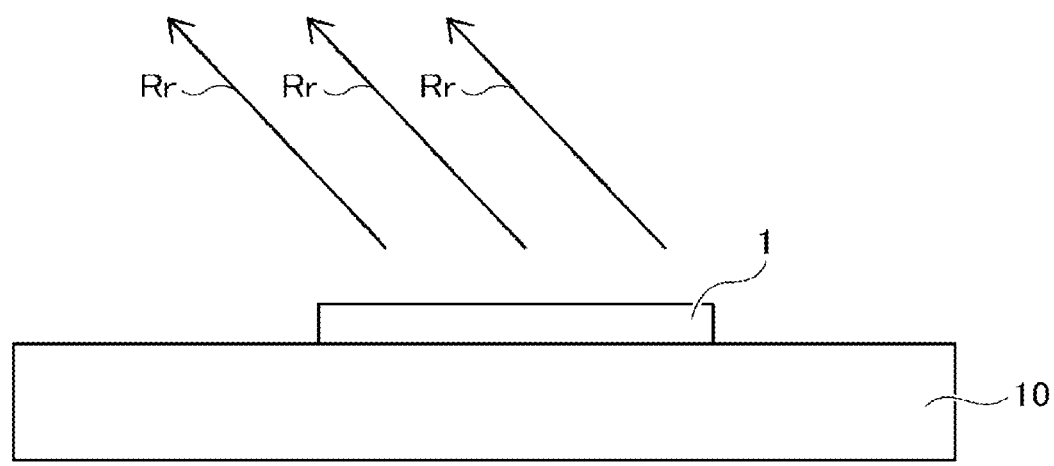
FIG. 19D is another view illustrating the simulated result when the specific voltage application pattern was applied.

FIGS. 19A to 19D are views illustrating simulated results when the voltage application pattern shown in FIG. 19E was applied. In FIG. 19A, the characteristics of the RCS in the azimuth direction is illustrated by an angular range on the opposite side. In FIG. 19B, the characteristics of the RCS in the elevation direction is illustrated by an angular range on the opposite side. As schematically shown in FIG. 19A, a radio wave was incident on the array of 8×8 unit elements 70 from a direction of −30 degrees (330 degrees) with the reference direction in the azimuth direction (direction of 0 degree) (see FIG. 19C) as in the simulation related to FIGS. 18A to 18E. In the elevation direction, the radio wave was incident on the array from the reference direction (direction of 0 degree). It should be noted that in FIG. 19C (also applicable to FIG. 19D), the incident direction (reflection direction in FIG. 19D) of the radio wave with respect to the communication device 1 including the array of 8×8 unit elements 70 are schematically illustrated.

In a case where the voltage application pattern shown in FIG. 19E was applied, when a radio wave was incident from a direction forming angle of −30 degrees with the reference direction (direction of 0 degree) in the azimuth direction, the simulated results showed characteristics that reflection toward a direction (direction of 20 degrees) forming an angle of 20 degrees with the reference direction in the azimuth direction was stronger. This reveals that the directivity control array 20 according to the above-mentioned Embodiment 1 can achieve the reflective characteristics that cannot be achieved by a simple metal plate.

The simulation related to FIGS. 19(A) to 19(E) is different from the simulation related to FIGS. 18(A) to 18(E) in terms of voltage application pattern as seen from comparison between FIG. 18(E) and FIG. 19(E). The other conditions are the same. From this point of view, it is revealed that a change in the voltage application patterns leads to a change in a reflection angle (reflection direction).

Figure 20A:
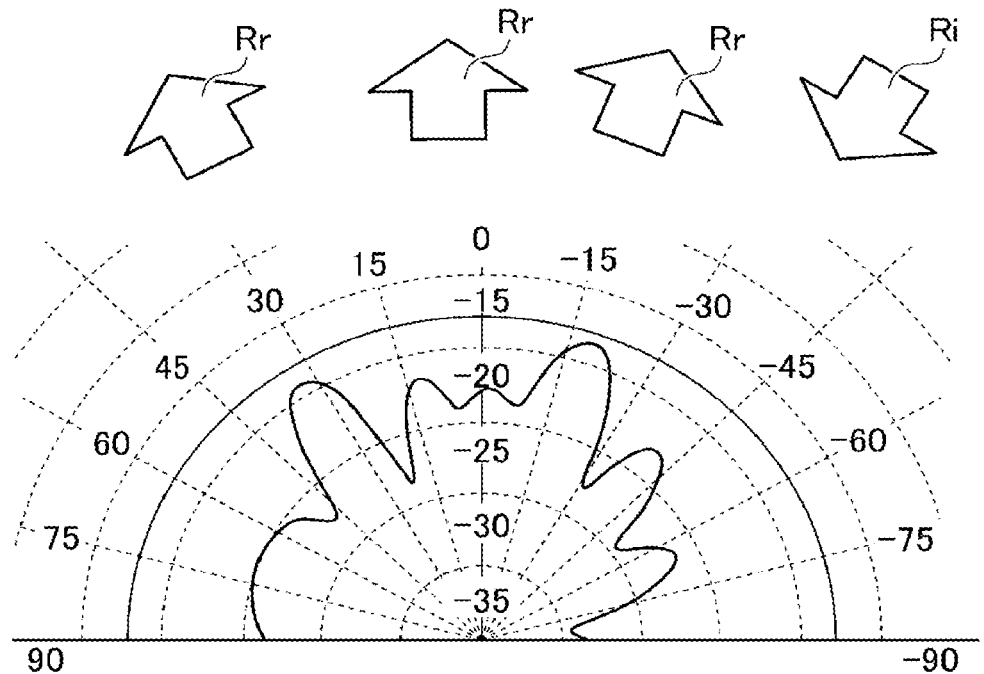
FIG. 20A is a view illustrating a simulated result when still another specific voltage application pattern was applied.
Figure 20B:
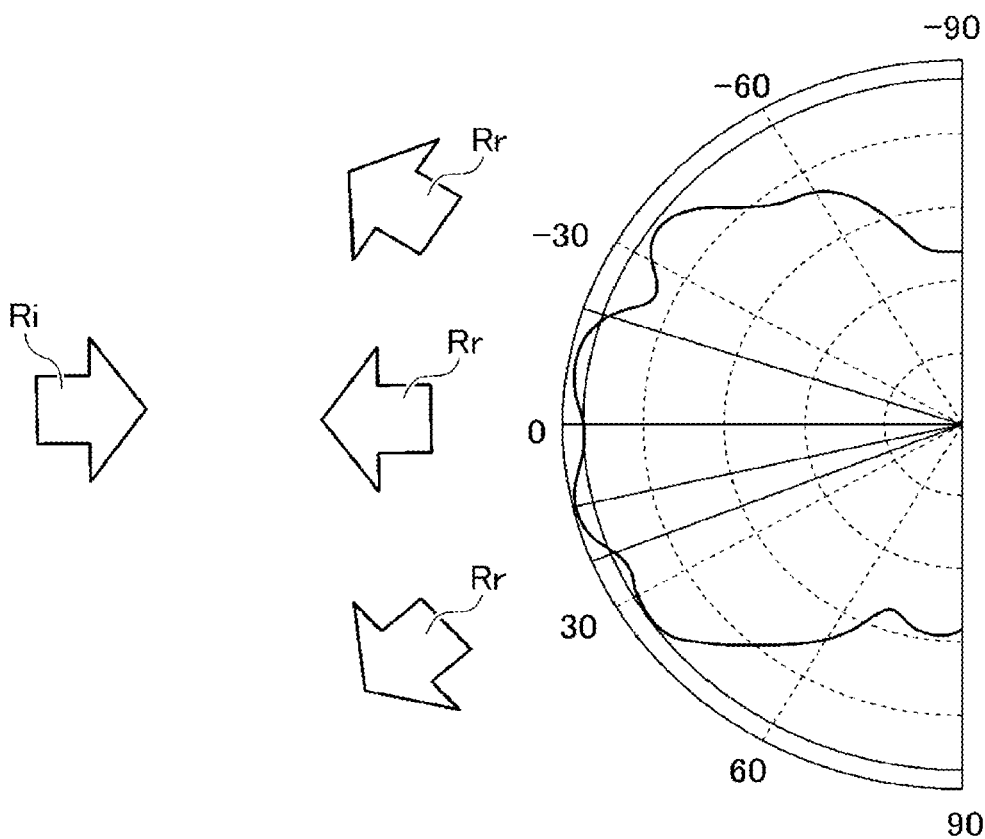
FIG. 20B is another view illustrating the simulated result when the specific voltage application pattern was applied.
Figure 20C:
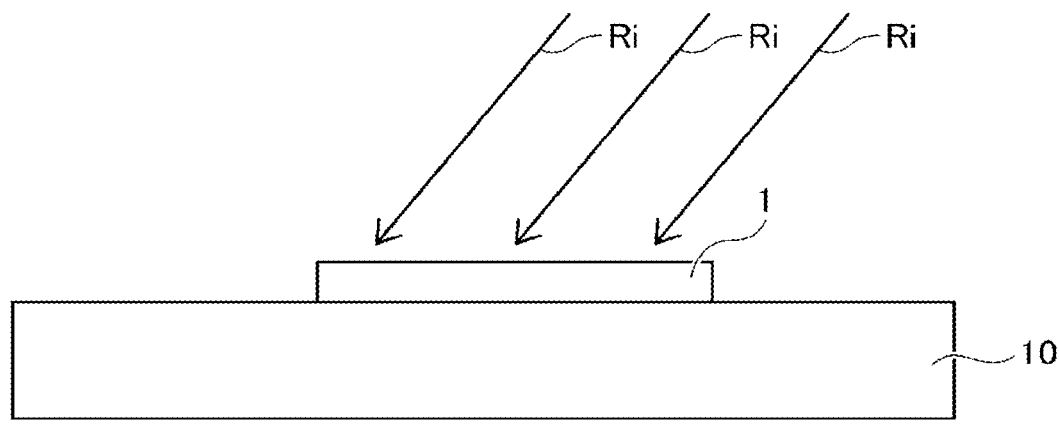
FIG. 20C is another view illustrating the simulated result when the specific voltage application pattern was applied.
Figure 20D:
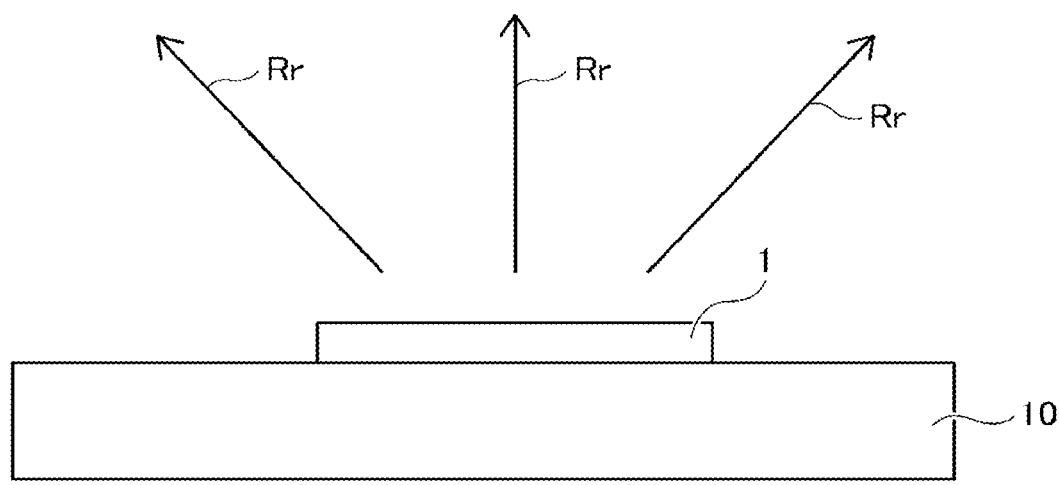
FIG. 20D is another view illustrating the simulated result when the specific voltage application pattern was applied.

FIGS. 10A to 20D are views simulated results when the voltage application pattern shown in FIG. 20E was applied. In FIG. 20A, the characteristics of the RCS in the azimuth direction is illustrated by an angular range on the opposite side. In FIG. 20B, the characteristics of the RCS in the elevation direction is illustrated by an angular range on the opposite side. As schematically shown in FIG. 20A, a radio wave was incident on the array of 8×8 unit elements 70 from the reference direction in the azimuth direction (direction of 0 degree) (see FIG. 20C) as in the simulation related to FIGS. 18A to 18E. In the elevation direction, the radio wave was incident on the array from reference direction (direction of 0 degree). It should be noted that in FIG. 20C (also applicable to FIG. 20D), the incident direction (reference direction in FIG. 20D) of the radio wave to the communication device 1 including the array of 8×8 unit elements 70 are schematically illustrated.

In a case where the voltage application pattern shown in FIG. 20E was applied, when a radio wave was incident from a direction forming an angle of −30 degrees with the reference direction (direction of 0 degree) in the azimuth direction, the simulated results showed characteristics that reflection was equalized over a comparatively wide angular range in the azimuth direction. This reveals that the directivity control array 20 according to the above-mentioned Embodiment 1 can achieve reflection characteristics that cannot be achieved by a simple metal plate.

The simulation related to FIGS. 20A to 20E is different from the simulations related to FIGS. 18A to 18E and FIGS. 19A to 19E in terms of voltage application pattern as seen from comparison among FIGS. 18E, 19E and 20E. The other conditions are the same. This reveals that a change in the voltage application patterns leads to not only a change in reflection angle (reflection direction) but also directivity (and, consequently coverage). In other words, when the voltage application pattern shown in FIG. 20E is applied, the coverage can be expanded in comparison with a case where the voltage application pattern shown in FIG. 18E or 19E is applied.

Figure 21:
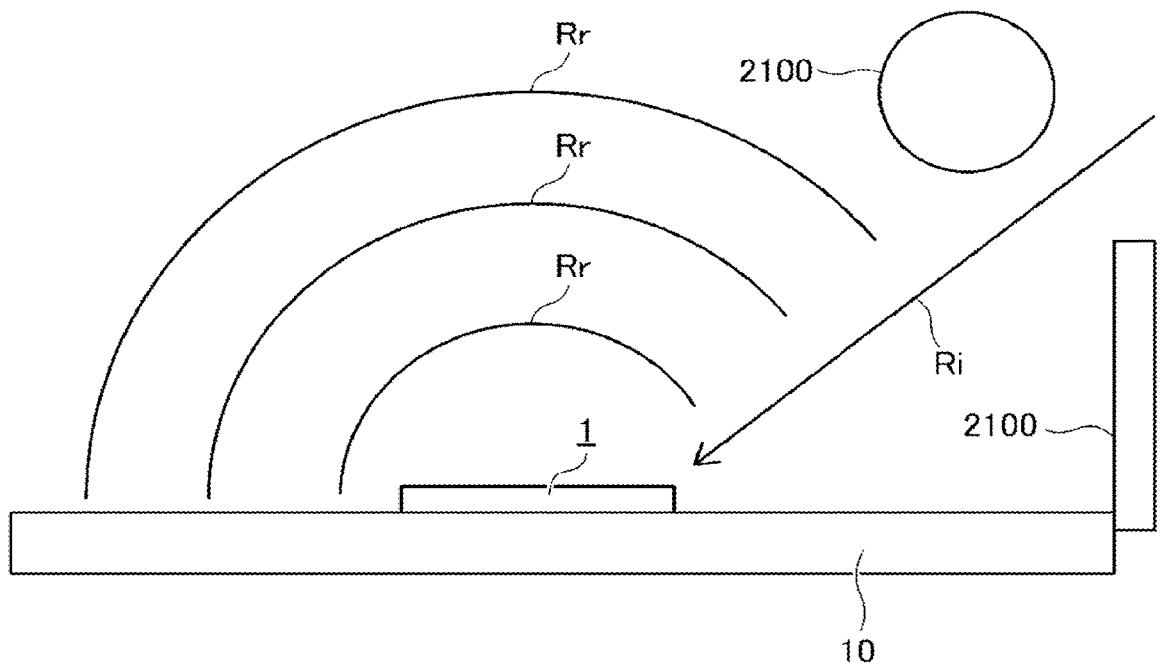

Voltage application patterns that can expand the coverage as just described above are appropriate for communications using relatively high frequencies. The reason is that insensitive areas as described above are likely to be created because higher frequencies increase the propagation loss due to reflection or diffraction. For example, under a circumstance where an insensitive area is likely to be created by obstructions 2100 as in FIG. 21, a radio wave is incident on a window glass 10, passing between the obstructions although the propagation path to the window glass 10 is limited (see an arrow Ri in FIG. 21). When a voltage application pattern capable of expanding the coverage is applied under such a circumstance, a reflection wave is isotropically formed toward an insensitive area from the communication device 1 as schematically showing the reflection wave as wavefronts Rr in FIG. 21. Thus, it is possible to effectively reduce the insensitive areas that could be created by the obstructions 2100.

Although the respective embodiments have been described in detail, the present invention is not limited to these specific embodiments. Various modifications and changes may be made within the scope of the claims. All or some of elements of the above-mentioned embodiments may be combined.

Figure 15:
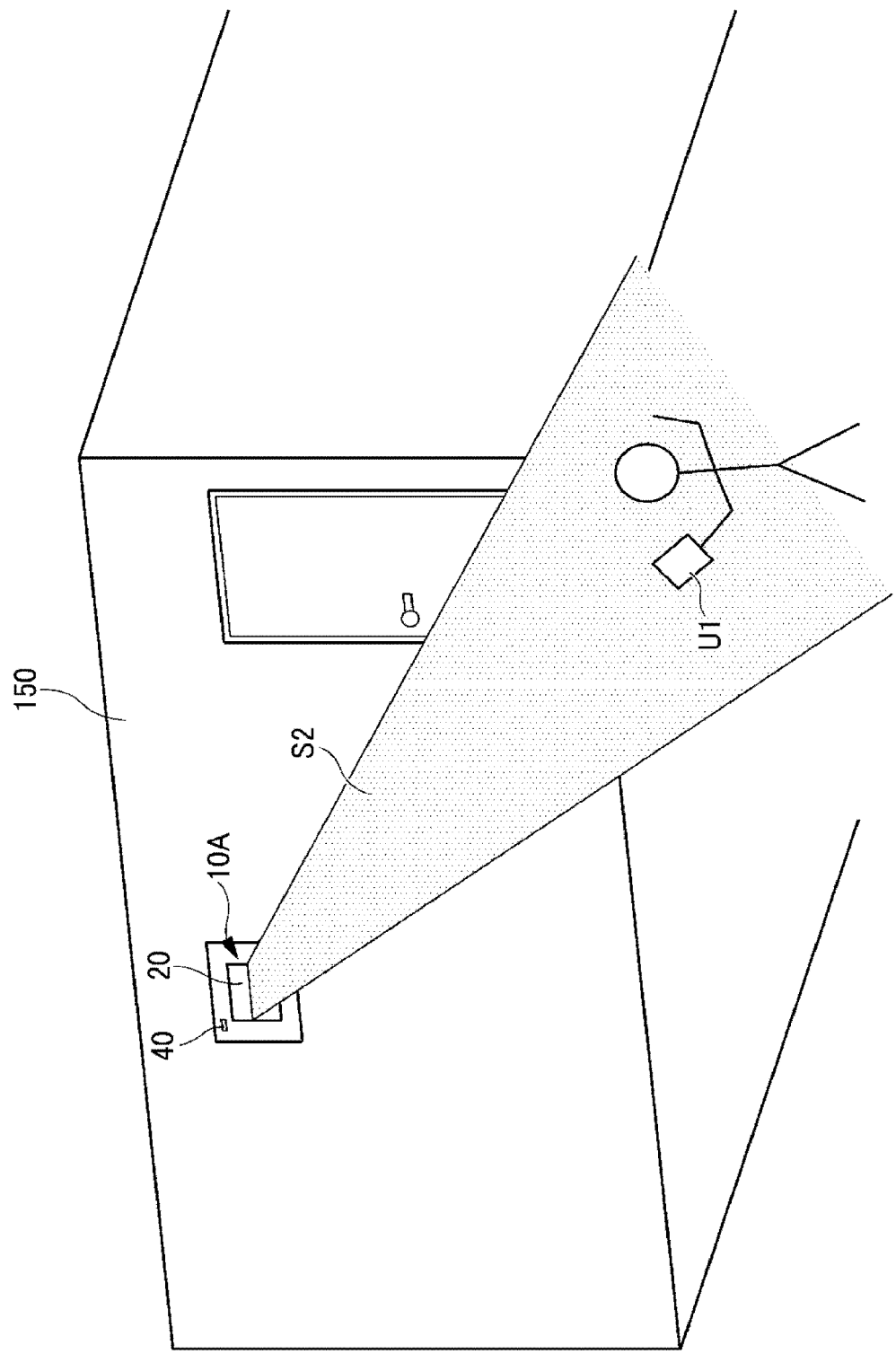
FIG. 15 is a view illustrating a modification (placed on a wall).

For example, although the directivity control arrays 20, 20A and 20B are disposed, using a window glass 10 as the base material in the respective embodiments mentioned above, the present invention is not limited to such a mode. For example, the directivity control arrays 20, 20A and 20B may be disposed by using, as the base plate, a transparent plate, such as a glass plate or resin plate, and be provided at an arbitrary place. For example, the directivity control array 20 may be disposed, using the base material 10A, and the base material 10A may be mounted to a room wall 150 as schematically shown in FIG. 15. In this case as well, even when the room is present in an insensitive area, the indoor user terminal U1 can communicate with the external user terminal U2 as in the other cases. Although the directivity control array is mounted on the wall 150 in the case shown in FIG. 15, the directivity control array may be mounted on the surface of another object, such as a display or a moving body, such as an automobile, an airplane, a railway vehicle or a ship.

The directivity control arrays 20, 20A and 20B may be disposed, using a transparent film as the base material. In this case, the transparent film may be a flexible, film-like dielectric sheet (such as a fluororesin sheet). For example, the transparent film may include a fluorine-based adhesive layer having a low loss and be bonded to a window glass 10 or posted to another position, using the adhesive layer.

Although the instruction indicating a directivity is input from outside in the respective embodiments, irrespectively where the user terminal U1 is present, the present invention is not limited to such a mode. For example, the instruction indicating a directivity may be generated so as to have a good communication environment, depending on the location of the user terminal U1 (for example, in response to detection by, e.g., indoor camera). In this case, when the instruction indicating a direction is input as an external input into the process 50, the directivity of the directivity control arrays 20, 20A and 20B is automatically controlled.

EXPLANATION OF REFERENCE SYMBOLS 1, 1A and 1B: Communication device
7: Sash
10: Window glass
10A: Base material
20, 20A and 20B: Directivity control array
21: Conductor
22: Conductor
30: Printed board
40 and 40B: Antenna unit
50 and 50A: Processor
51: MICOM
52: Communication circuit
53: DC Power supply generator
90: Wiring
91: Ground line
92: Power supply line
150: Wall
521: Communication interface
522: Baseband circuit
523: RF Circuit

What is claimed is:
1. A wireless communication device, comprising:
a base material;
a directivity control array positioned on the base material and having a plurality of unit elements positioned in a two-dimensional pattern;
an antenna unit configured to radiate the radio wave toward the unit elements of the directivity control array;
a wiring positioned on the base material and configured to be connected to a DC power supply and to apply a DC voltage to at least one of the unit elements in the directivity control array; and
a controller comprising circuitry configured to control the DC voltage to be applied to the at least one of the unit elements in the directivity control array with one voltage application pattern set from a plurality of voltage application patterns,
wherein the base material comprises a window glass or a film configured to be attached to a window glass such that the antenna unit is positioned at the window glass or a frame comprising a sash for the window glass.

2. The wireless communication device according to claim 1, wherein the voltage application patterns include a first voltage application pattern configured to output a radio wave from the directivity control array in a first direction based on a radio wave incident on the unit elements in a first incident mode, and a second voltage application pattern configured to output a radio wave from the directivity control array in a second direction based on the radio wave incident on the unit elements in the first incident mode, where the second direction is different from the first direction.

3. The wireless communication device according to claim 2, wherein the circuitry of the controller sets, as the one voltage application pattern, at least one of the first voltage application pattern and the second voltage application pattern.

4. The wireless communication device according to claim 3, wherein the controller is positioned on the base material.

5. The wireless communication device according to claim 4, further comprising:
a power supply generator positioned on the base material and configured to generate the DC power supply from an external power supply source.

6. The wireless communication device according to claim 3, wherein each of the unit elements of the directivity control array comprises a plurality of conductors positioned in the two-dimensional pattern, and an area of the base material where the conductors are positioned has a transmittance of at least 50% for visible light in a state where the conductors are positioned.

7. The wireless communication device according to claim 2, wherein the controller is positioned on the base material.

8. The wireless communication device according to claim 7, further comprising:
a power supply generator positioned on the base material and configured to generate the DC power supply from an external power supply source.

9. The wireless communication device according to claim 2, wherein each of the unit elements of the directivity control array comprises a plurality of conductors positioned in the two-dimensional pattern, and an area of the base material where the conductors are positioned has a transmittance of at least 50% for visible light in a state where the conductors are positioned.

10. The wireless communication device according to claim 1, wherein the voltage application patterns includes a first voltage application pattern configured to output a radio wave from the directivity control array with a first directivity based on a radio wave incident on the unit elements in a first incident mode, and a second voltage application pattern configured to output a radio wave from the directivity control array in a second directivity based on the radio wave incident on the unit elements in the first incident mode, the second directivity being different from the first directivity.

11. The wireless communication device according to claim 10, wherein the circuitry of the controller sets, as the one voltage application pattern, at least one of the first voltage application pattern and the second voltage application pattern.

12. The wireless communication device according to claim 11, wherein the controller is positioned on the base material.

13. The wireless communication device according to claim 12, further comprising:
a power supply generator positioned on the base material and configured to generate the DC power supply from an external power supply source.

14. The wireless communication device according to claim 10, wherein the controller is positioned on the base material.

15. The wireless communication device according to claim 14, further comprising:
a power supply generator positioned on the base material and configured to generate the DC power supply from an external power supply source.

16. The wireless communication device according to claim 10, wherein each of the unit elements of the directivity control array comprises a plurality of conductors positioned in the two-dimensional pattern, and an area of the base material where the conductors are positioned has a transmittance of at least 50% for visible light in a state where the conductors are positioned.

17. The wireless communication device according to claim 1, wherein the controller is positioned on the base material.

18. The wireless communication device according to claim 17, further comprising:
a power supply generator positioned on the base material and configured to generate the DC power supply from an external power supply source.

19. The wireless communication device according to claim 1, further comprising:
a frame comprising a sash for the base material,
wherein the antenna unit is positioned at the frame for the window glass.

20. The wireless communication device according to claim 1, wherein each of the unit elements of the directivity control array comprises a plurality of conductors positioned in the two-dimensional pattern, and an area of the base material where the conductors are positioned has a transmittance of at least 50% for visible light in a state where the conductors are positioned.

* * * * *